United States Patent
Sundararaman et al.

(10) Patent No.: US 10,445,314 B1
(45) Date of Patent: Oct. 15, 2019

(54) INSTANT UNIFIED SEARCH

(71) Applicant: AMAZON TECHNOLOGIES, INC., Seattle, WA (US)

(72) Inventors: Arunachalam Sundararaman, Chennai (IN); Babu Durairaj, Chennai (IN); Nakul Srivathsa, Chennai (IN); Rinosh Sasidharan, Mumbai (IN); Kevin Terry Burkhart, Seattle, WA (US); Peter John Thomas Johnson, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 714 days.

(21) Appl. No.: 14/563,788

(22) Filed: Dec. 8, 2014

Related U.S. Application Data

(60) Provisional application No. 62/050,649, filed on Sep. 15, 2014.

(51) Int. Cl.
*G06F 17/30* (2006.01)
*G06F 16/24* (2019.01)
*G06F 3/02* (2006.01)

(52) U.S. Cl.
CPC ............ *G06F 16/24* (2019.01); *G06F 3/0227* (2013.01)

(58) Field of Classification Search
None
See application file for complete search history.

(56) References Cited

U.S. PATENT DOCUMENTS

| | | | | |
|---|---|---|---|---|
| 5,900,024 A * | 5/1999 | Morearty | ................ | G06F 3/023 712/201 |
| 2004/0216135 A1 * | 10/2004 | Heimbeck | ............... | G06F 9/542 719/318 |
| 2006/0206454 A1 * | 9/2006 | Forstall | ............. | G06F 17/30864 |
| 2010/0100839 A1 * | 4/2010 | Tseng | .................... | G06F 1/1624 715/780 |
| 2011/0302274 A1 * | 12/2011 | Lee | .................. | H04N 21/25816 709/217 |
| 2012/0054175 A1 * | 3/2012 | Barsness | ........... | G06F 17/30477 707/719 |
| 2014/0267363 A1 * | 9/2014 | Kocienda | .............. | G06T 11/001 345/592 |
| 2014/0280048 A1 * | 9/2014 | Bumgarner | ........... | G06F 3/0482 707/722 |
| 2015/0242474 A1 * | 8/2015 | Mikalsen | .......... | G06F 17/30867 707/722 |
| 2015/0370476 A1 * | 12/2015 | Liu | ..................... | G06F 3/04886 715/771 |

* cited by examiner

*Primary Examiner* — Hung Q Pham

(74) *Attorney, Agent, or Firm* — Lindauer Law, PLLC

(57) ABSTRACT

User devices are used to access data ranging from calendar items to Internet searches. An instant unified search interface provided by a unified search helper module enables a user of the user device to search data associated with one or more applications across applications on the user device as well as data in remote locations, such as on a server via a network connection. The unified search helper module may be provided as part of the operating system module. In some implementations, entry of particular keys using a keyboard coupled to the user device may initiate the instant unified search. The keyboard may be a physical keyboard or a virtual keyboard.

20 Claims, 19 Drawing Sheets

INSTANT UNIFIED SEARCH

PRIORITY

This application claims priority to U.S. Provisional Patent Application Ser. No. 62/050,649 filed on Sep. 15, 2014, entitled "Instant Unified Search." The entirety of this previously filed application is hereby incorporated by reference.

BACKGROUND

A variety of user devices, such as electronic book ("e-Book") readers, desktop computers, portable computers, game consoles, smartphones, tablet computers, and so forth, are used to access data ranging from calendar items to Internet searches. Searching for information stored on, or accessible by, user devices has traditionally been cumbersome.

Figure 1:
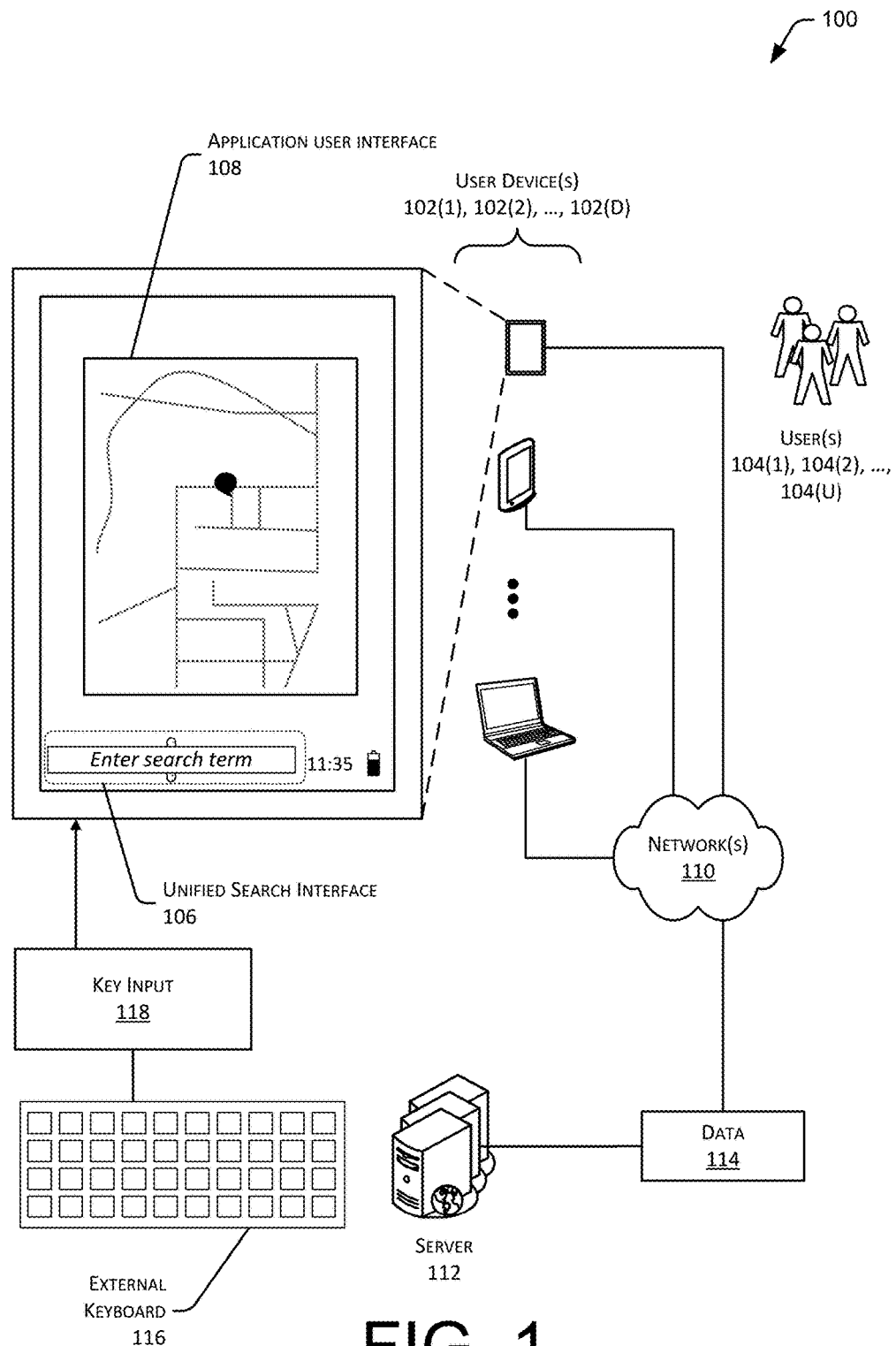
FIG. 1 illustrates a system for providing a unified search interface which may persist during presentation of user interfaces associated with one or more applications or may be triggered by particular key events resulting from key inputs.

Certain implementations and embodiments will now be described more fully below with reference to the accompanying drawings, in which various aspects are shown. However, various aspects may be implemented in many different forms and should not be construed as limited to the implementations set forth herein. Like reference numbers refer to like elements throughout the figures.

DETAILED DESCRIPTION

A variety of user devices, such as electronic book ("e-Book") readers, desktop computers, portable computers, game consoles, televisions, smartphones, tablet computers, and so forth, are used to access various forms of information including, but not limited to, content such as movies, books, and music. As the amount of information accessible by user devices increases, finding information of interest becomes more difficult for users. Traditional searches on user devices are complicated in situations where a user device executes an application to perform a non-search related task, such as entering a calendar item, drawing a picture, accessing medical data, viewing Internet content, and so forth. These traditional searches involve the user invoking a particular search application, returning to a main menu or home screen, or engaging in activity in which attention of the user shifts away from a particular non-search application executing on the user device to the particular search application. For example, when typing a note in a note application on a smartphone, initiating a search may call for the user to enter several commands. These commands may then open a user interface for that search. In some implementations, the user interface may obscure or replace the user interface of the original non-search application (such as the note application), disrupting the user's view of the information being entered. As a result, searching for information on the user device has traditionally been disruptive to the user and the operation of the non-search application.

Described herein are systems and methods for providing an instant unified search ("unified search"). An operating system of the user device, an application executing on the user device, or a combination thereof may be configured to implement the unified search.

An instant unified search interface may be configured to appear upon the entry of particular keys using an external keyboard, virtual keyboard, or other input device. A unified search allows for searching across one or more applications, data associated with those applications, remote resources such as on external servers, and so forth. The data associated with applications includes application data, metadata, content data, and so forth. The unified search interface provides the user with controls to initiate the unified search and vary the scope of that search. For example, where the user interface is graphical, the unified search interface may appear at the bottom of a display as a search box. The unified search interface may persist on the display or may appear responsive to particular key inputs.

The user may perform a search using the unified search interface and receive search results which may be sorted. The sort may be by calculated relevance, last application focus, history of application focus, and so forth. For example, search results associated with the application presented on the display at the time of the search may be prioritized and presented first.

The unified search interface may be configured with a search scope control. The search scope control allows the user to vary a search scope, which controls what information is searched or filtered for presentation. The search scope may determine one or more of what, where, or how information is searched. For example, the user may select to search just within a particular note document, across all note documents, or across all data on the user device and on the Internet via an Internet search engine. The search scope control may allow for dynamic adjustment of the search scope. In some implementations, the search scope control may comprise a slider control element configured to vary the search scope. For example, the user may enter a search term, see search results, and move the slider control element on a touch screen display representing the search scope control to change the search scope by narrowing or broadening the search results as desired.

In some implementations, the selection of the scope may be context-based. For example, a default or initial scope may be predefined for a particular application, portion of an application, physical location, and so forth. For example, the search scope control may be omitted from the user interface or may be set to a predetermined level upon invocation of the unified search interface. In some implementations, the context may be determined using one or more of current foreground application, previous search history, common misspellings, content available within a library accessible to the user, and so forth.

Illustrative System

FIG. 1 illustrates a system 100 for providing a unified search interface which persists during presentation of user interfaces associated with one or more applications. One or more user devices 102(1), 102(2), . . . , 102(D) may be used by one or more users 104(1), 104(2), . . . , 104(U). As used herein, letters enclosed by parenthesis such as "(D)" or "(U)" indicate an integer having a value greater than zero. The user devices 102 may include e-Book readers, laptops, tablet computers, game consoles, media players, desktop computers, portable computers, in-vehicle systems, and so forth. The user devices 102 are described in more detail below with regard to FIG. 2.

A unified search interface 106 is presented by the user device 102 to the user 104. The unified search interface 106 is configured to receive user input. The user input may be one or more of the following: gestures, machine recognized speech, text entered via a touch sensor or buttons, and so forth. The unified search interface 106 may then present at least a portion of the search results generated by a unified search module. The unified search module is discussed below in more detail with regard to FIG. 2. In some implementations, the term "module" may include a complete executable application, a portion of an application, individual executable components, and so forth.

The unified search interface 106 may be configured to persist on the user device 102. For example, where the unified search interface 106 is visually presented on the display as shown in FIG. 1, the unified search interface 106 may remain presented even during transitions of applications between a foreground state and a background state. Continuing the example, a clock provided on a desktop user interface may also persist regardless of the applications executing, what windows may be open, and so forth. In another example, on a smartphone, a wireless signal strength indicator persists and is visible regardless of the applications executing.

In some implementations, the unified search interface 106 may persist but be concealed from view. For example, during presentation of a movie on the display of the user device 102, the persistent elements such as the unified search interface 106, the wireless signal strength indicator, and so forth, may be temporarily concealed from view, reduced in size, replaced with a representative element such as an icon, and so forth. This concealment leaves the display unobstructed for presentation of the movie. The user 104 may readily access the unified search interface 106 by touching a button, a portion of the touch screen, or typing text using a keyboard, such as with an external keyboard 116. As a result, the unified search interface 106 is persistently available, but in some implementations, the unified search interface 106 may be concealed or minimized.

In other implementations, the unified search interface 106 and the unified search module that provides the underlying functionality may be executed upon occurrence of particular key inputs from the user 104 to the user device 102. For example, a key input may result in a particular key event. One or more conditions may be determined, such as if the application has opted in or out of the unified search, whether the key event has been previously designated as being associated with the unified search, or if one or more launch conditions have been satisfied. Responsive to the key event and satisfaction of the conditions, the unified search module may be executed and the key event may be passed to the unified search module. Continuing the example, the user 104 may be watching a movie using a media presentation application and may begin typing at an input device, such as the external keyboard 116, the name "Faran Tahir". When the media presentation application does not have a control in focus that is able to process the key events corresponding to these letters, the key events may be passed to a unified search helper module.

When the key events are unhandled by the current application (in this example, the media presentation application), the unified search module may be executed or brought to the foreground. Once the unified search module is available, the key events may be passed to the unified search module, and the search executed.

In addition to the unified search interface 106 which may remain presented during normal operation of the user device 102 or which may be presented on entry of particular key events, an application user interface 108 may be presented on the user device 102. The application user interface 108 provides a user interface for other functions, such as a note application, a map application, an Internet browser application, eBook reader application, media presentation application, an operating system configuration, and so forth.

The unified search interface 106, the application user interface 108, and so forth, may include one or more input controls. Input controls are configured to accept input from the user 104. Each input control may be configured to process particular key events. For example, a radio button input control may be configured to process "spacebar" key events to select or deselect the radio button or "arrow key events" to navigate between radio buttons. Other key events such as letters may be disregarded. The input controls may include, but are not limited to, text boxes, combo boxes, checkboxes, radio buttons, sliders, list boxes, spinners, drop-down lists, menus, and so forth.

When a particular input control of an application has input focus, the operating system will pass key events to that input control. In some implementations, the operating system may detect particular key events and direct the particular key events to another process. The key events comprise data indicative of input made to a button, keyboard, virtual keyboard, and so forth. For example, a particular combination of key inputs 118 may result in a key event indicating the user device 102 is to be rebooted, speaker volume is to be changed, and so forth. Continuing the example, a "Function+Up Arrow" combination of key events 118 may indicate the speaker volume is to be increased.

While user interfaces in these illustrations are depicted as visual user interfaces, such as a graphical user interface ("GUI") or a character user interface ("CUI"), the unified search interface 106 may be provided in non-visual interfaces. For example, where haptic or tactile output is used in a user device 102 for use by the visually impaired, the unified search interface 106 may be presented haptically instead of, or in addition to, a visual presentation. In another example, a CUI may omit graphical elements and use text to provide for menus, data presentation, and so forth.

In this and the following illustrations, the unified search interface 106 is depicted at the bottom of the display of the user device 102. However, in other implementations, the unified search interface 106 may be presented in other areas of the display, or the unified search interface 106 may be switched to presentation in other modes, such as a haptic presentation mode when a haptic output device is available. For example, a haptic output device may present information using Braille. The unified search interface 106 may be hidden in the application user interface 108 until key inputs 118 corresponding to unhandled or other previously specified key events are detected. For example, a key event may be deemed unhandled when it is not recognized as input to the application that currently has input focus. In another example, a key event may be deemed unhandled when the application attempts to perform a function but fails or is otherwise unable to do so. Upon detection of an unhandled or other previously specified key event, the unified search module may be executed (if not already running) and input focus may transition to an input control of the unified search module that is configured to accept and process the key events.

The user device 102 may be configured to connect to a network 110. This coupling may be wired or wireless. The network 110 may include, but is not limited to, a public network such as the Internet, a private network such as an institutional or personal internet, a virtual private network, a wireless wide area network, a cellular data network, a local area network, a metropolitan area network, a telephone network, and so forth. The network 110 may also be coupled to a server 112 and other devices. The user devices 102 may exchange data 114 with other user devices 102 or with the server 112 via the network 110. This data 114 may comprise user input received by the unified search interface 106, search results, and so forth.

The server 112 may use the data 114 to generate search results, which may then be provided to the user device 102, such as via the network 110. The server 112 is described below in more detail with regard to FIG. 3.

The user device 102 may accept input from the user 104 using one or more input devices. In one implementation, the input device may comprise the external keyboard 116 that connects wirelessly to the user device 102. For example, the external keyboard 116 may use a Bluetooth wireless network interface to send key input 118 information to the user device 102. The key input 118 may be processed by the user device 102 to generate one or more key events, such as described below. In another implementation, the input device may comprise a virtual keyboard, such as presented on a touchscreen.

Figure 2A:
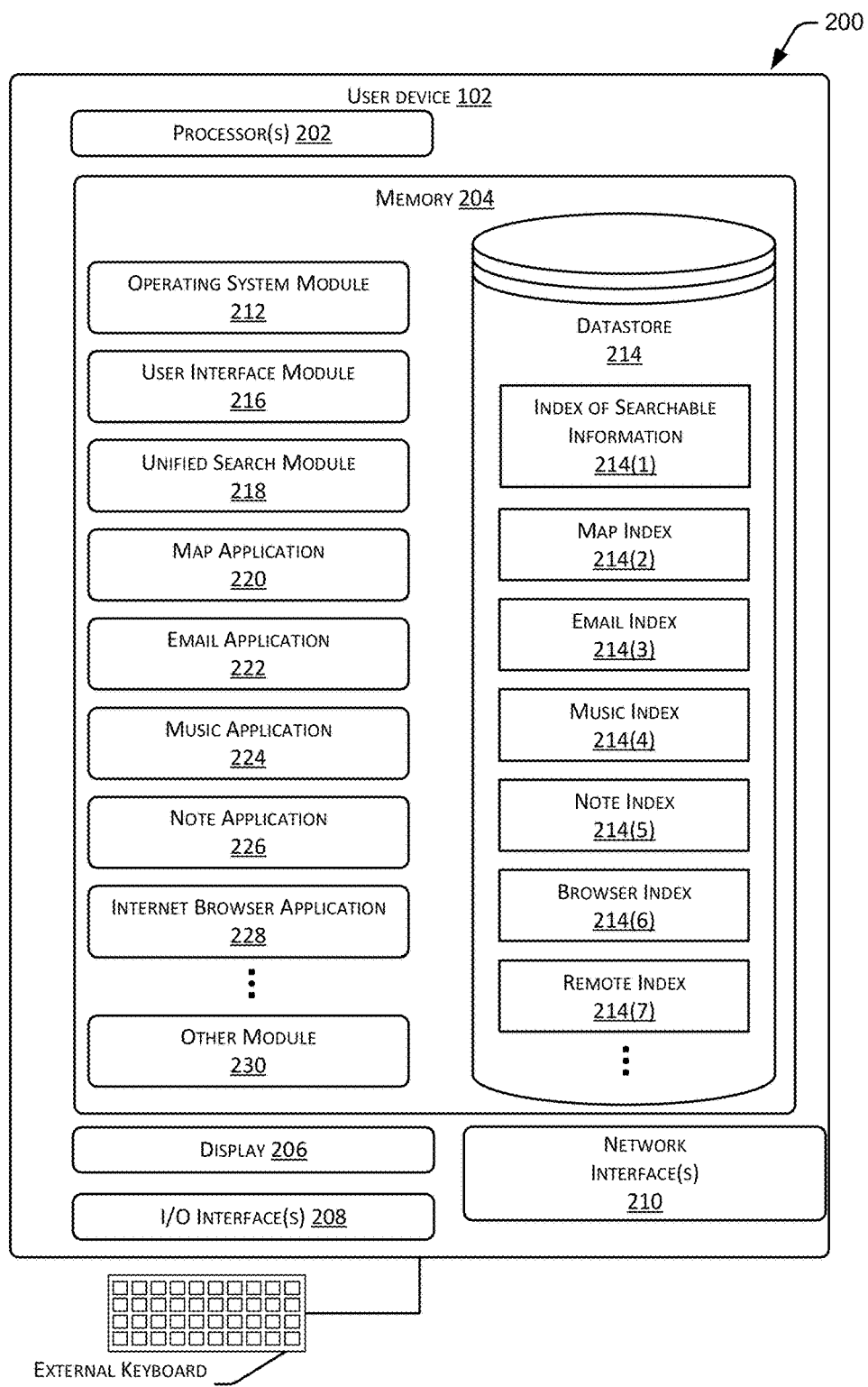
FIGS. 2A and 2B illustrate a block diagram of the user device configured to provide unified search functionality.

FIG. 2A illustrates a block diagram 200 of a user device 102 configured to provide unified search functionality via the unified search interface 106. The user device 102 may comprise one or more hardware processors 202 ("processors"), one or more memories 204, one or more displays 206, one or more input/output ("I/O") interfaces 208, and one or more network interfaces 210. The user device 102 may include other devices not depicted, such as a power supply, clock, and so forth.

The processor 202 may comprise one or more cores and is configured to access and execute at least in part instructions stored in the one or more memories 204. The one or more memories 204 comprise one or more non-transitory computer-readable storage media ("CRSM"). The one or more memories 204 may include, but are not limited to, random access memory ("RAM"), flash RAM, magnetic storage media, optical storage media, quantum memory, memristor memory, and so forth. The one or more memories 204 may be volatile in that information is retained while providing power. The one or more memories 204 may also be non-volatile in that information is retained without application of external power.

The display 206 is configured to present visual information to the user 104. The display 206 may comprise a reflective or emissive display configured to present images to the user 104. An emissive display emits light to form an image. Emissive displays include, but are not limited to, backlit liquid crystal displays, plasma displays, cathode ray tubes, light-emitting diodes, image projectors, and so forth. Reflective displays use incident light to form an image. The incident light may be provided by the Sun, general illumination in the room, a reading light, and so forth. Reflective displays include, but are not limited to, electrophoretic displays, interferometric displays, cholesteric displays, and so forth. The display 206 may be configured to present images in monochrome, color, or both. In some implementations, the display 206 of the user device 102 may use emissive, reflective, or combination displays with emissive and reflective elements. In some implementations, the display 206 may be external to the user device 102, such as when the user device 102 comprises a game console which is configured to operate by coupling to a television to provide visual output.

The one or more I/O interfaces 208 may also be provided in the user device 102. The I/O interfaces 208 allow for coupling devices such as keyboards, joysticks, touch sensors, cameras, microphones, speakers, haptic output devices, external memories, and so forth, to the user device 102. For example, the keyboard may comprise a non-virtual keyboard, such as physical keys that may be actuated to provide input. The keyboard may be coupled to the user device 102 wired or wirelessly, and may be internal or external to the user device 102.

The one or more network interfaces 210 provide for the transfer of data 114 between the user device 102 and another device directly such as in a peer-to-peer fashion, via the network 110, or both. The network interfaces 210 may include, but are not limited to, personal area networks ("PANs"), wired local area networks ("LANs"), wireless local area networks ("WLANs"), wireless wide area networks ("WWANs"), and so forth. For example, the network interface 210 may include a Bluetooth interface, a Wi-Fi interface, and so forth. The network interfaces 210 may utilize acoustic, radio frequency, optical, or other signals to exchange data 114 between the user device 102 and another device such as an access point, a host computer, another user device 102, and so forth. In one implementation, the external keyboard 116 may be wirelessly coupled to the user device 102 by way of a PAN, such as a Bluetooth network interface 210.

The one or more memories 204 may store instructions or modules for execution by the processor 202 to perform certain actions or functions. The following modules are included by way of illustration, and not as a limitation. Furthermore, while the modules are depicted as stored in the memory 204, in some implementations, these modules may be stored at least in part in external memory, such as in the server 112, which is accessible to the user device 102 via the network 110. These modules may include an operating system ("OS") module 212 configured to manage hardware resources such as the I/O interfaces 208 and provide various services to applications or modules executing on the processor 202. The OS module 212 may be configured to accept and process key inputs 118 from one or more input devices such as non-virtual keyboards comprising physical buttons (e.g. the external keyboard 116), virtual keyboards (e.g. provided by a touch sensor), and so forth.

The OS module 212 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Wash., USA; or other operating systems. For example, the OS module 212 may implement a version of the Android operating system from Google, Inc. of Mountain View, Calif., USA. Continuing the example, the OS module 212 may implement a variant of the Android OS based on the Android Open Source Project.

The OS module 212 is discussed in more detail below with regard to FIG. 2B. In some implementations, the OS module 212 may be configured to launch the unified search module 218, present the unified search interface 106, and so forth.

The one or more memories 204 may also store a datastore 214. The datastore 214 may comprise one or more databases, files, linked lists, trees, or other data structures to store information. The datastore 214 may be configured to store an index of searchable information 214(1) indicative of which data indices or other data structures are to be searched when a search is input at the unified search interface 106. These data indices may include a map index 214(2), email index 214(3), music index 214(4), note index 214(5), browser index 214(6), remote index 214(7), and so forth. These indices may be associated with particular applications or modules configured to execute on the user device 102. A remote index 214(7) may be provided which contains index information associated with remote resources, such as those stored at least in part on the server 112.

The one or more memories 204 may also include a user interface module 216. The user interface module 216 is configured to provide a user interface which handles inputs from and outputs to the user 104 during operation of the user device 102. The user interface provided by the user interface module 216 includes the unified search interface 106 described above and may include the application user interface 108. For example, the user interface module 216 may be configured to present the unified search interface 106 as well as the application user interface 108 associated with an application in the foreground, the operating system, and so forth. User inputs may include key presses, touches on a touch screen, movement of the user device 102 or a portion thereof, speech input, gestures, images acquired by a camera, and so forth. Outputs may include presentation on the display 206, sound from a speaker, haptic output generating a physical sensation or the appearance of a physical sensation, and so forth.

A unified search module 218, also included in the memory 204, is configured to accept user input received by the unified search interface 106 and generate search results. The unified search module 218 may be configured to work independently or in conjunction with a module executing on the server 112 as accessed via the network 110. The unified search module 218 may be configured to search all information stored on the user device 102 or a subset of that information. For example, the unified search module 218 may be configured to search the contents of the datastore 214. In some implementations, particular applications may be registered for search by the unified search module 218. This registration may include adding the application, associated data files, associated indices, and so forth, to a list of searchable information or resources. For example, in some implementations, the registration may include file names and paths for searchable information.

By utilizing the registration, the unified search module 218 may be configured to omit from a search the searchable information such as indices or other information which are not designated. In some implementations, registration may take place at the time of installation of the module or application on the user device 102. In other implementations, the registration may be performed post-installation such as when a user 104 specifies what information on the user device 102 is to be searched or not. Selective registration is discussed below with regard to FIG. 6. The index of searchable information 214(1) in the datastore 214 may be configured to store registration data, such as what data or portion thereof is associated with which applications that are searchable by the unified search module 218.

The unified search module 218 may be configured to operate in one or more different human languages. For example, the user device 102 may be configured to use localization settings for different languages including English, Hindi, Spanish, Japanese, German, Chinese, and so forth. The user 104 may provide key inputs 118 corresponding to letters or symbols in the language corresponding to the localization setting.

In some implementations, the unified search module 218 or operation thereof may be controlled based on user input. For example, the user 104 may access a user interface to enable or disable operation of the unified search module 218.

The memory 204 may also store various modules configured to provide applications. These modules may include a map application 220 configured to provide map or directional information to a user 104. For example, the user 104 may request directions to a particular street address. Map information, or map related information such as appointment locations, may be stored in the map index 214(2) of the datastore 214. The unified search module 218 may be configured to access the map index 214(2) to generate search results.

An email application 222 may be configured to send and receive email messages. Information, such as email message content, header information, and so forth, may be maintained in an email index 214(3). The unified search module 218 may be configured to access the email index 214(3).

A music application 224 may be configured for playback of audio files. The music index 214(4) in the datastore 214 may contain information about the audio files, such as track name, duration, artist, album, and so forth.

A note application 226 may be configured to allow the user 104 to enter notes or other documents. The note index 214(5) in the datastore 214 may contain information about note content, date created, date last edited, and so forth.

An Internet browser application 228 is configured to provide access to content such as web pages. For example, the Internet browser application 228 may be configured to render at least a portion of Hyper-Text Markup Language ("HTML") files on the display 206. The browser index 214(6) in the datastore 214 may be based on data acquired from Internet browsing history or data associated with operation of the Internet browser application 228. For example, the browser index 214(6) may comprise a list of recently visited web pages.

The indices 214(2)-214(7) are depicted as being separate data structures within the datastore 214 for convenience and not by way of limitation. For example, in some implementations, the indices 214(2)-214(7) may be integrated with other data for the associated application or within the application itself.

Other modules 230 may be present in the memory 204 as well, such as media presentation modules, eBook reader modules, virtual private networking modules, text-to-speech modules, speech recognition modules, and so forth. For example, a media presentation module may be configured to play video content on the user device 102.

Figure 2B:
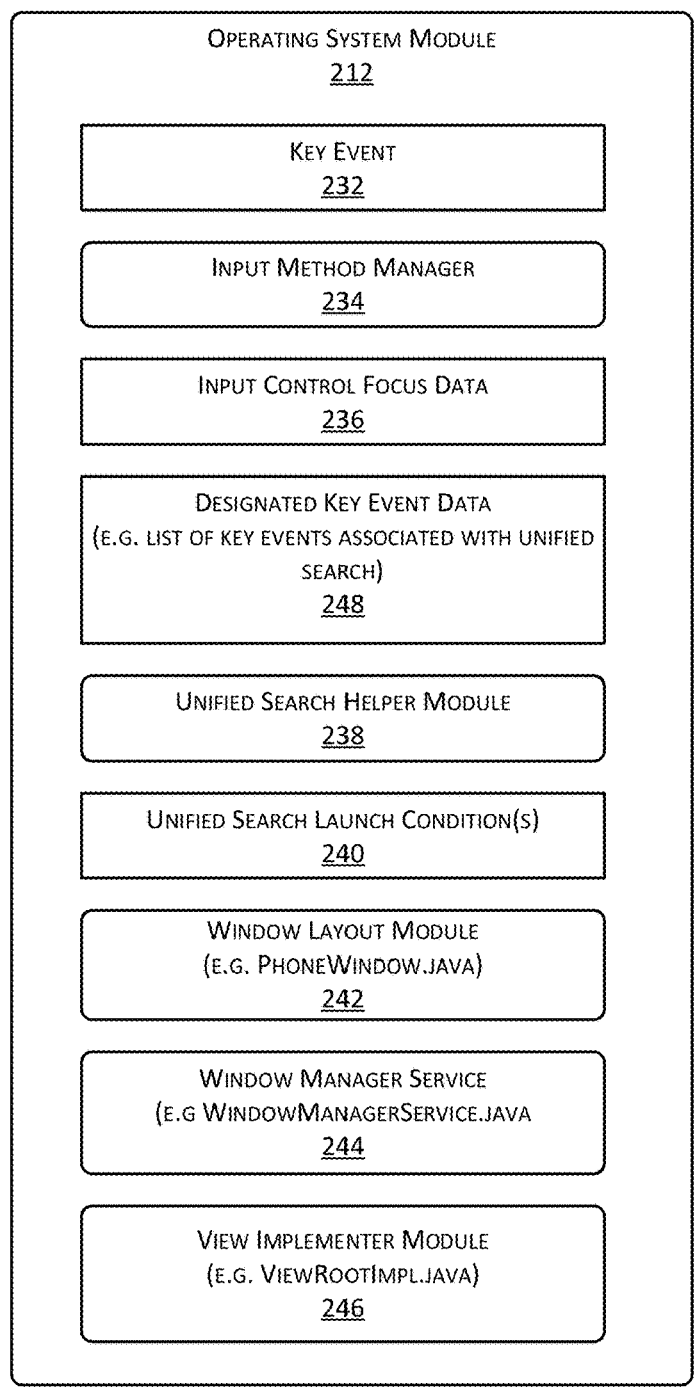

FIG. 2B continues the block diagram 200 of the user device 102 and depicts an enlargement of some of the components of the OS module 212. In one implementation, the OS module 212 may implement a variant of the Android Open Source Project ("AOSP"). The functions provided by the OS module 212 or other modules executing on the user device 102 or in communication with the user device 102 may also be referred to as a "framework". While this disclosure describes the operation of the system 100 in terms of the AOSP, it is understood that in other implementations the techniques described herein may be applied to other frameworks. For example, the functionality described herein may be implemented in the iOS operating system promulgated by Apple Inc. of Cupertino, Calif., USA; the Microsoft Windows operating system as promulgated by Microsoft Corp. of Redmond, Wash., USA; the BlackBerry OS as promulgated by BlackBerry Ltd. of Waterloo, Ontario, Canada; and so forth.

As described above, the OS module 212 may accept key inputs 118 from an input device, such as the external keyboard 116. The one or more key inputs 118 may be processed to produce one or more key events 232.

An input method manager 234 may be configured to arbitrate the interaction between modules and a current input method. For example, the input method manager 234 may manage the interaction between the inputs and the processes executing on the user device 102. In the context of the AOSP, the input method manager 234 may comprise android.view.inputmethod.InputMethodManager. Input control focus data 236 may be provided by the input method manager 234. The input control focus data 236 provides information about which input control, if any, is currently bound to inputs and thus will receive the key events 232 resulting from user input.

Designated key event data 248 may comprise information indicative of key events 232 associated with use of the unified search module 218. Responsive to input of specific key events 232 corresponding to those stored in the designated key event data 248, the unified search module 218 may be executed or brought into focus. For example, the designated key event data 248 may comprise a subset of printable characters or control characters that, when entered as input, trigger the unified search interface 106. The key events 232 in the designated key event data 248 may include the key events 232 including a combination of a control character and a printable character. The designated key event data 248 may be specified by a developer or automated process. In some implementations, the user 104 may be provided with a user interface and permission to add or remove entries to the designated key event data 248, which allow for customization of the operation.

The printable characters may comprise those characters that are associated with one or more glyphs suitable for presentation, such as on the display 206. In comparison, control characters are unassociated with one or more glyphs and may be used to provide control signals to the OS module 212 or another process. For example, a control character as expressed in Unicode may be "U+007F" indicating the "delete" function.

The unified search helper module 238 or another module may use one or more unified search launch conditions 240 to determine when the unified search module 218 is to be used. The unified search launch conditions 240 allow for the implementation of policies or rules to determine under what conditions the unified search module 218 may be utilized. The unified search launch conditions 240 may include, but are not limited to, one or more of whether the key event 232 entered is present in the designated key event data 248, whether the user device 102 is in use by a person designated as a child, whether the user device 102 is executing in a demonstration mode, whether the application currently in the foreground is configured to use the unified search, whether a certain number of keystrokes have occurred within a specific time, and so forth. In one example, where the user 104 logged into (or is otherwise identified as using) the user device 102 is a minor child, the unified search may be disabled to prevent inadvertent access to content that is restricted or otherwise unsuitable for access by the minor child. When the unified search launch conditions 240 have been satisfied, the unified search module 218 may be utilized.

A unified search helper module 238 is configured to coordinate operation of the various modules described herein. In some implementations, the functionality attributed to the unified search helper module 238 may be distributed to and present in several other modules. For example, at least a portion of the functionality may be included in the unified search module 218, or may be included in the OS module 212. In another example, the unified search helper module 238 may be omitted entirely and the functions performed by other modules. A window layout module 242 is configured to provide for the "look and feel" or decoration associated with the application user interface 108. In the context of the AOSP, the window layout module 242 may comprise PhoneWindow.java. The PhoneWindow.java module may be instantiated when a window is called, and may be used to add a top-level view to the window manager service. In some implementations, when the key events 232 are unhandled, the key events 232 are propagated down to PhoneWindow.onKeyDown( ) of AOSP such as implemented in the PhoneWindow.java module. The key events 232 to be used for the unified search may be indicated in designated key event data 248. For example, the key events 232 may be a subset of printable characters. In some implementations, when the unified search module 218 is not currently executing on the processor 202, the unified search module 218 may be launched or executed by PhoneWindow.java.

The unified search module 218 may be configured to access the OnSearchRequested( ) data of the application currently in focus. The application or other module that is currently in focus may opt in or out of participation in the unified search. For example, the application may have internal search functionality and thus may opt-out of using the unified search module 218. For example, the OS module 212 may read metadata of the currently running application to find:

<meta-data android:name="InstantSearch" android:
        value="1"/>

In this example, a value of "1" indicates that the unified search module 218 will be used. A value of "0" indicates that the unified search will not be used. The metadata entry may be included in the <application> and <activity> sections of AndroidManifest.xml.

As illustrated by this example, the application can override the functionality of the unified search module 218, allowing developers or administrators to not use the unified search functionality. If not overridden by the application, the key events 232 associated with the key inputs 118 will be passed to the unified search module 218 as described herein.

It may occur that the user 104 is using another application on the user device 102 when they choose to perform a search. For example, the user 104 may be listening to music with the music application 224. The input method manager 234 may have the input control focus on the music application 224. As the user 104 provides key inputs 118 to generate a search string or other value, the corresponding key events 232 may be preserved for delivery after a change in the input control focus to the unified search module 218. This prevents key events 232 from being lost or missed, such as having the initial keys typed on the external keyboard 116 being lost or omitted without being provided to the unified search module 218.

The key events 232 may be missed or unhandled in that they are not eventually handled by an application. The key events 232 may get missed in several scenarios. In a first scenario, the key input 118 may be entered while an application other than the unified search module 218 had the focus. In a second scenario, the key input 118 may be entered while the unified search module 218 was loading and hence no window or input control would be in focus to receive those inputs.

To handle the first scenario, the first key event 232 that is unhandled by the current application may be saved in a global context that is accessible to other applications. In one implementation, the first key event 232 may be saved in a view hierarchy of a user interface. The view hierarchy may comprise user interfaces and the portions thereof, such as accessed using the "View" class in the AOSP. The view hierarchy may be maintained by a window manager service 244. The window manager service 244 is configured to provide an interface for the applications to communicate with a window manager process. The window manager process may maintain order of presentation of windows, presentation layout, perform windows transitions, animations, and so forth. The window manager service 244 in the AOSP may comprise the window manager service 244 as implemented by the android.view.WindowManager.

When the unified search launch conditions 240 have been met, the unified search helper module 238 may be configured to determine if the unified search launch conditions 240 have been met. If so, the unified search helper module 238 may determine if the unified search module 218 is currently executing. For example, a module or application may be deemed to be executing while a process is actively running on the processor 202, while a portion of the module that is stored in the memory 204 and ready for execution may be in a "wait" or "sleep" mode, and so forth. In comparison, a module or application may be deemed to be not executing when stored in the memory 204 but having no OS process identifier associated therewith.

If the unified search module 218 is not currently executing, it may be executed responsive to a determination of an unhandled key event 232 associated with the unified search. For example, the PhoneWindow.java may execute the unified search module 218.

The unified search module 218 may take some time to load or become ready to accept the input control focus. For example, the unified search module 218 may take between 500 milliseconds (ms) and 1000 ms from execution until being ready to process input.

Once the input method manager 234 generates the input control focus data 236 indicating that the unified search module 218 is bound and has the focus, a view implementer module 246 may be used to retrieve the key event 232 stored in the global context. Once retrieved, the key event 232 may be processed by the unified search module 218.

In the AOSP environment, the view implementer module 246 may use ViewRootImpl.doProcessInputEvents( ) to query the WindowManagerService for the first key event 232. Once retrieved, the first key event 232 may be processed before processing subsequent key events 232, such as resulting from later key inputs 118.

Handling of the second scenario described above may be implemented by using the input queue provided for use by the unified search module 218. For example, in the AOSP, the key events 232 are received and sent sequentially, such as in a "first in first out" order. As a result, applications process the subsequent key events 232 in AOSP only after the first key event 232 is processed. For example, the subsequent key events 232 may be held in an input queue (such as provided by the "InputQueue") until the query from the view implementer module 246 is received.

Using this behavior, the processing of the first key event 232 received by the unified search module 218 may thus be delayed until a window and an input control associated with the unified search module 218 gains focus. Once focus is gained by the unified search module 218 or an input control thereof, the input method manager 234 indicates the inputs are now bound to the unified search module 218. The view implementer module 246 may now query the window manager service 244, and the first key event 232 stored in the global context may be returned to the unified search module 218. The subsequent key events 232 present in the input queue of the unified search module 218 may then be returned to the unified search module 218 in the order in which they were originally received.

As described above, in some implementations, the application may override the unified search functionality. For example, the OS module 212 may read the following metadata of the currently running application:

<meta-data android:name="InstantSearch" android:
        value="1"/>

The OS module 212, or a portion thereof, such as the unified search helper module 238, may process this metadata. A value of "1" may indicate that the unified search will be launched. A value of "0" may indicate that the unified search will not be launched. The metadata entry is applicable for <application> and <activity> sections of AndroidManifest.xml.

Figure 3:
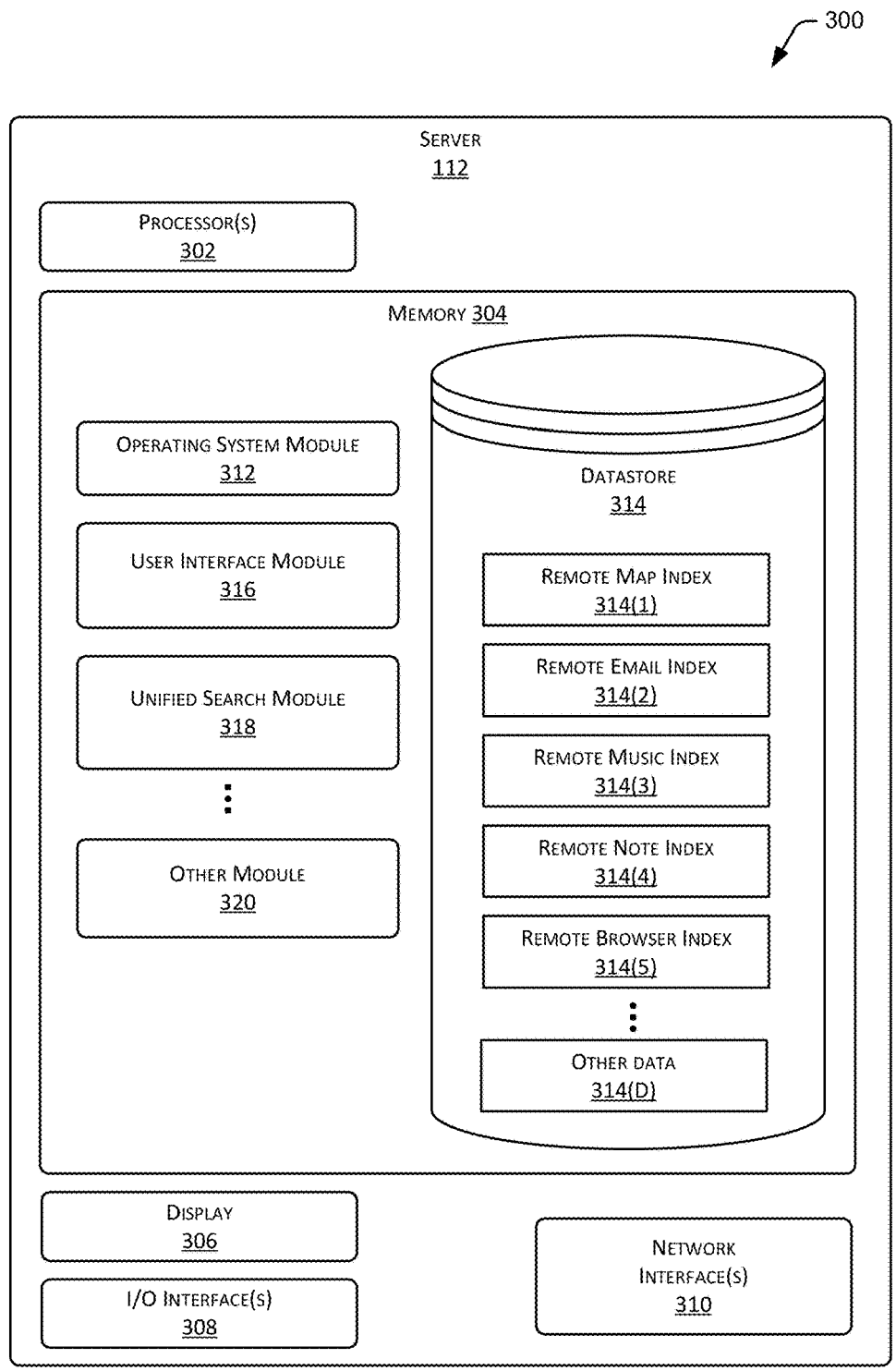
FIG. 3 illustrates a block diagram of a server configured to provide information to a search initiated by the unified search interface.

FIG. 3 illustrates a block diagram 300 of the server 112 configured to provide information to a search initiated by the unified search interface 106 and the unified search module 218. The server 112 may comprise one or more processors 302, one or more memories 304, one or more displays 306, one or more I/O interfaces 308, and one or more network interfaces 310. The memory 304 may store an operating system module 312 and a datastore 314. These components are similar to those described above with regard to FIG. 2. The modules and the functions below are shown on a single server for 112 illustrative purposes and not by way of limitation. It is understood that the modules and the functions associated therewith may be provided by, or distributed across, one or more other servers 112.

The datastore 314 may store a remote map index 314(1), a remote email index 314(2), a remote music index 314(3), a remote note index 314(4), a remote browser index 314(5), and other data 314(D). The other data 314(D) may include a catalog or other information indicative of items available from a merchant. These indices may be similar to those described above with regard to FIG. 2 and index data, which is present in storage external to or remote to the user device 102, such as in the server 112. For example, the remote music index 314(3) may be configured to store audio file index data associated with audio files stored on the server 112 or another server 112, which are accessible by the user device 102 for streaming or download but not presently stored in the memory 204 of the user device 102. In another example, the remote browser index 314(5) may comprise information from Internet browsing which is facilitated with a split architecture where activity in various Internet browser subsystems is divided between the user device 102 and the server 112.

A user interface module 316 is stored in the memory 304. The user interface module 316 may be configured to provide a user interface, such as a web page, which is configured for display on the user device 102 or on another device. In some implementations the user interface module 316 may provide similar functionality to that provided by the user interface module 216.

The memory 304 may also store a unified search module 318. The unified search module 318 may be configured similarly to the unified search module 218 described above in the user device 102 in FIG. 2. In some implementations, the unified search module 218 may work in conjunction with the unified search module 318. For example, the unified search module 218 on the user device 102 may pass along at least a portion of the user input received from the unified search interface 106 to the unified search module 318 on the server 112 to generate search results based on the indices in the datastore 314.

The unified search module 318 may be configured to access other search modules on the server 112 or on other servers 112. For example, the unified search module 318 may be configured to, when the search scope is set for maximum scope, search resources across web servers and other accessible storage on remote devices.

Other modules 320 may be present in the memory 304 as well. These modules may provide functions including authorization, authentication, accounting, security, and so forth.

Figure 4:
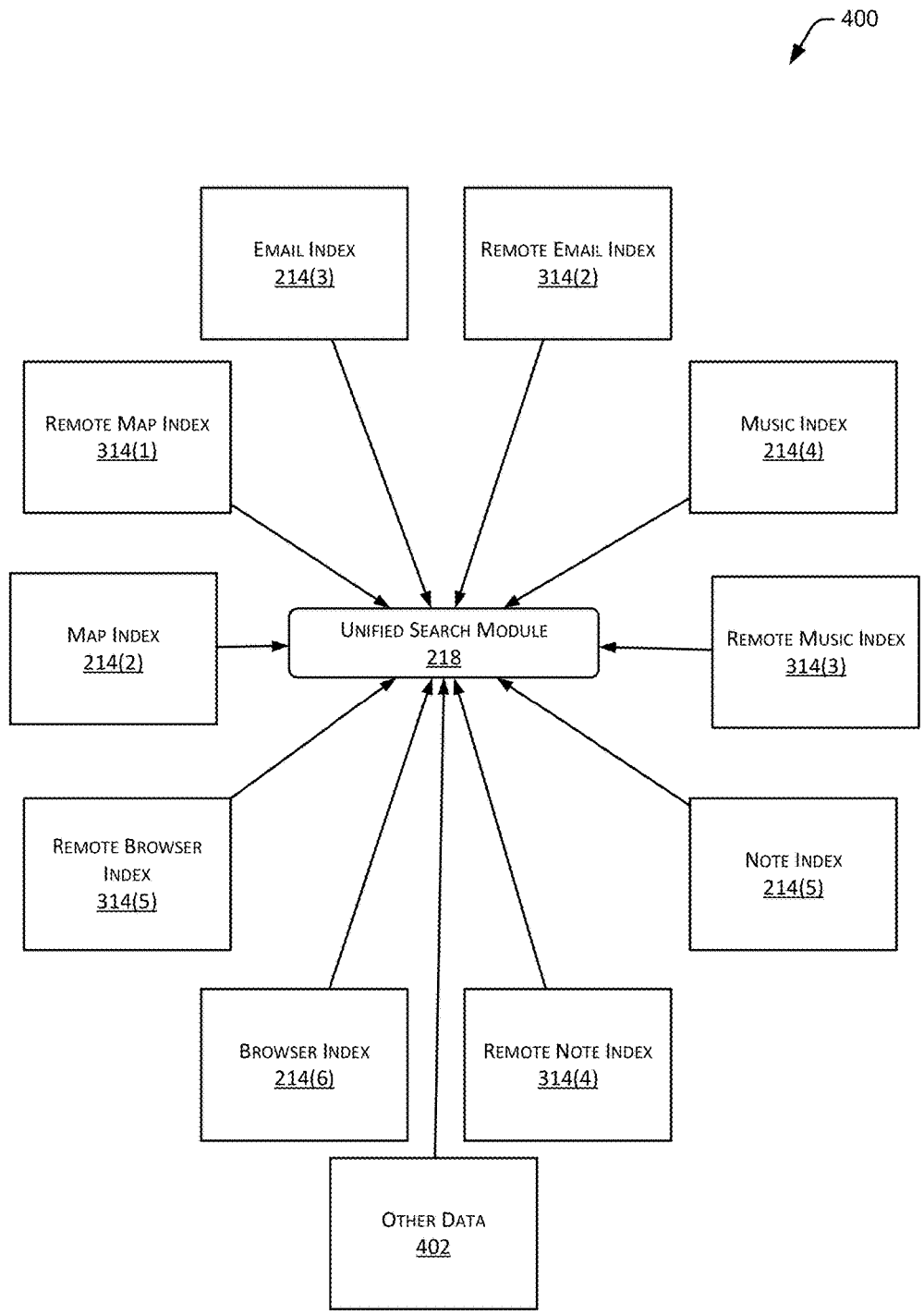
FIG. 4 illustrates a block diagram of data which may be used during the search initiated by the unified search interface.

FIG. 4 illustrates a block diagram 400 of the searchable information which may be used during the search initiated by the unified search interface 106 to generate search results. This illustration shows the unified search module 218 of the user device 102 for ease of illustration only and not by way of limitation. As described above, in some implementations, the search results may be provided by the unified search module 218 of the user device 102, the unified search module 318 of the server 112, or a combination thereof.

The unified search module 218 or 318 may access searchable information comprising one or more of the following: the map index 214(2), the remote map index 314(1), the email index 214(3), the remote email index 314(2), the music index 214(4), the remote music index 314(3), the note index 214(5), the remote note index 314(4), the browser index 214(6), the remote browser index 314(5), and so forth. In some implementations, as discussed above, particular indices or other data may be specifically included or excluded from the search based at least in part on entries in the index of searchable information 214(1).

The searchable information may also include other data 402. In one implementation, the other data 402 may include a catalog or other information indicative of items available from a merchant. For example, the other data 402 may include item detail information about items available for sale. The other data 402 may include non-index data, such as e-Books, HTML files, documents, OS data, text, audio files, video files, and so forth. For example, when the user 104 initiates a search with the unified search interface 106, the unified search module 218 may search the contents of e-Books present on the user device 102. Additional searchable information may be appended to the index of searchable information 214(1). For example, new information in the datastore 314 of the server 112 may be appended to the index of searchable information 214(1) such that the new information is now accessible via the unified search interface 106.

Illustrative User Interfaces

Figure 5:
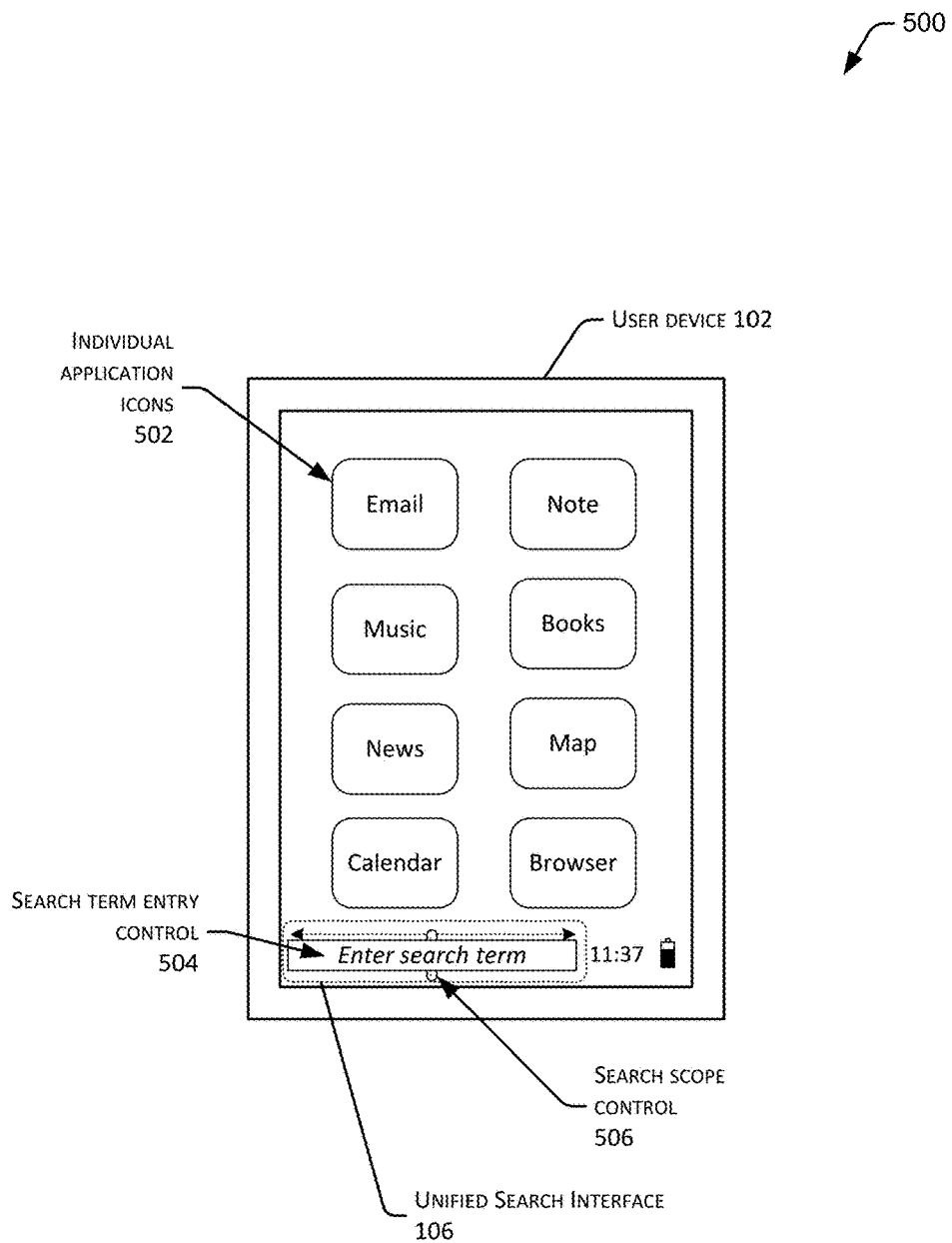
FIG. 5 is an illustrative user interface comprising the unified search interface.

FIG. 5 is an illustrative user interface 500 presented on the display 206 of the user device 102. In this and the following examples in FIG. 6-10, the user device 102 is depicted as a tablet computer or a smartphone. However, the unified search interface 106 may be provided on other user devices 102 as described above.

The user interface 500 comprises a set of individual application icons 502 representing the different applications accessible on the user device 102. Activation of the individual application icons 502, such as by selecting with a cursor or touching where the user device 102 comprises a touch sensor, may bring the module associated with the application to the foreground. For example, touching the "Email" icon may execute the email application 222.

A designated portion of the display 206 may be used for presentation of the unified search interface 106. For example, as shown here, the unified search interface 106 is presented at the bottom of the display 206 on the user device 102. The unified search interface 106 may be configured to persist or be visible or presented at all times during normal operation, excluding time for boot up and shutdown of the user device 102. For example, when the user interface uses a window metaphor, the unified search interface 106 may be configured such that one or more windows cannot occlude it. As a result, the unified search interface 106 remains visible during use of the user device 102.

The designated portion of the display 206 in which the unified search interface 106 is presented may be fixed or moveable on the display 206 of the user device 102. For example, the user 104 may move the unified search interface 106 to another position on the display 206. As mentioned above, in some implementations, the unified search interface 106 may be persistent in remaining presented on the display 206 of the user device 102. In other implementations, the unified search interface 106 may not be presented and instead may be accessed by particular key events, such as the user 104 entering text on an external keyboard 116.

In this illustration, the unified search interface 106 comprises one or more elements which may include a search term entry control 504 and a search scope control 506. The search term entry control 504 provides a user interface element with which the user 104 may enter a search term, select a search term, and so forth. The search term may be text, human speech, an image, sound, and so forth. For example, the search term entry control 504 may be configured to accept text typed on a keyboard or a picture captured from a camera of the user device 102.

In some implementations, the unified search interface 106 may be configured to present in the search term entry control 504 previously entered items such as words, phrases, icons, names of files or applications previously accessed, and so forth. The user 104 may then select one of these items, build a new search based on these items, or enter a different item.

The unified search module 218 may be configured to initiate a unified search upon a user command, such as pressing an "enter" or "done" button. In another implementation, the unified search module 218 may initiate a series of searches based on ongoing input by the user 104. For example, the user 104 may select one icon from a list, followed by another, and so forth, which proceed to generate and subsequently narrow the search.

The unified search interface 106 may include a search scope control 506 configured to accept user input with regard to a desired search scope. As described above, the search scope determines one or more of what, where, or how information is searched. For example, a narrow search scope may be limited to data available on the user device 102. In comparison, a medium search scope may comprise the data available on the user device 102 as well as information stored remotely associated with the user device 102 or the user 104. Likewise, a broad search scope may include all of that in the medium search scope plus results from an Internet search engine.

The search scope control 506 may be configured to modify the search by the unified search module 218 or presentation of search results previously generated by the unified search module 218. For example, the unified search module 218 may be configured to generate search results using the broadest available scope but may present the search results constrained by a setting of the search scope control 506.

The search scope control 506 may be dynamically variable before, during, or after entry of data within the search term entry control 504. For example, the user 104 may move a sliding search scope control 506 to set a particular search scope, and then enter the search term into the search term entry control 504. In comparison, the user 104 may enter the search term, and then use the search scope control 506 to vary the scope of the search or the presentation of search results.

The unified search interface 106 may be presented when the user 104 is not yet logged in or identified by the user device 102. For example, the user device 102 may be locked and require user input to unlock the user device 102 for general use. While the user device 102 is locked, the unified search interface 106 may be presented and accessible for use. In some implementations, when the user 104 initiates a search using the unified search interface 106 but is not yet logged in or identified, the unified search module 218 may be configured to return a subset of results which would otherwise be obtained by executing the search while logged in. For example, when the user device 102 is locked, the search may be restricted to the music index 214(4) local to the user device 102 but not the remote music index 314(3) or the email index 214(3). When unlocked, the same search may return results from all of the indices which are indicated in the index of searchable information 214(1).

Figure 6:
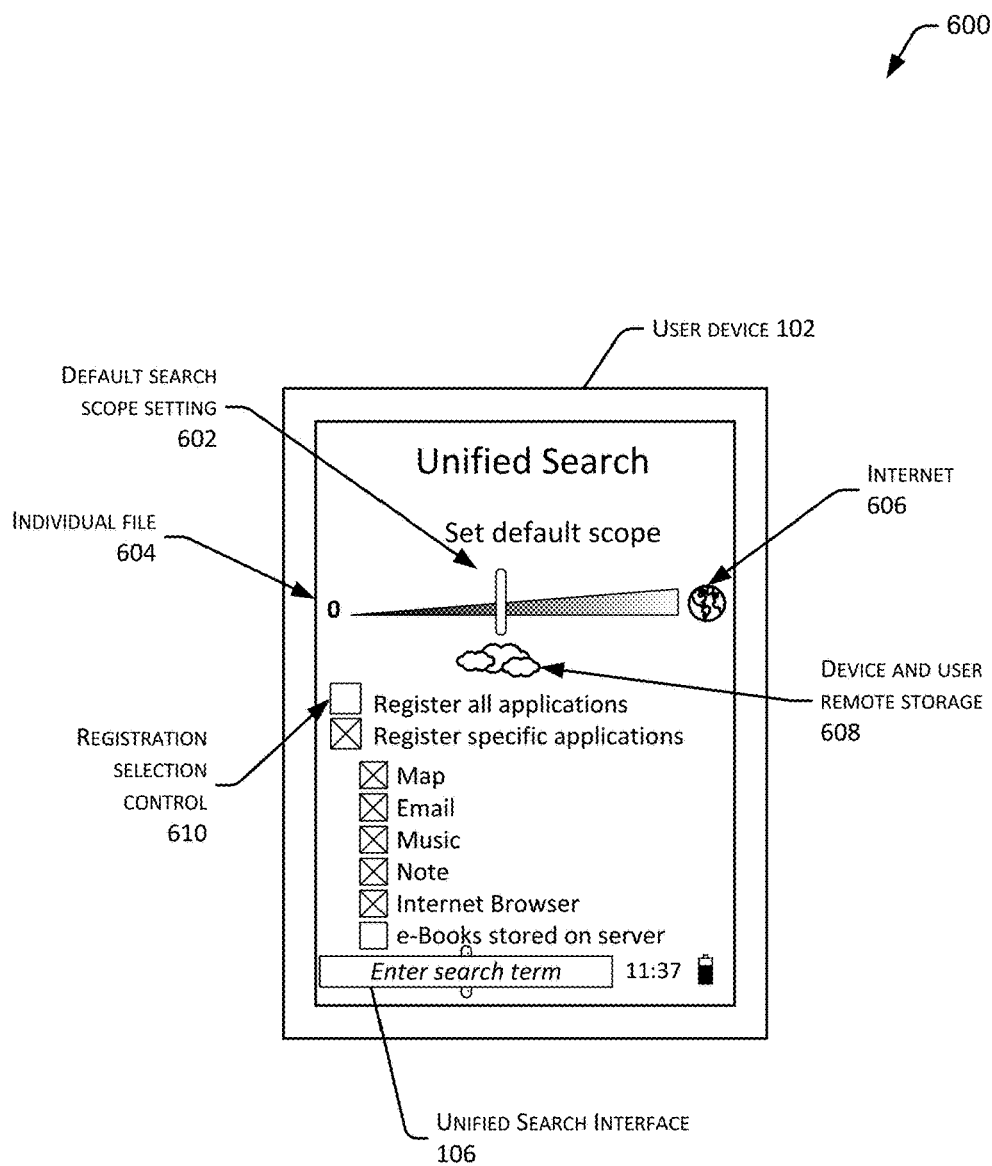
FIG. 6 illustrates a user interface to configure unified search functionality on the user device.

FIG. 6 illustrates a user interface 600 to configure unified search functionality on the user device 102. Different users 104 may have different preferences or conditions for the execution of a unified search. The user interface 600 illustrates some of the configuration settings which may be made by the user 104 or an administrator to change operation of the unified search module 218 on the user device 102 or the server 112.

A default search scope setting 602 is illustrated in FIG. 6. The default search scope setting 602 indicates the current default scope which will be used when the user 104 initiates a unified search with the unified search interface 106 and processed by the unified search module 218. This is a default setting and may be overridden by the user 104 as described above by adjusting the search scope control 506.

The search scope may be progressive, ranging from one end of a continuum to another. As shown here, the search scope may range from an individual file 604 to the Internet 606. At the midpoint of the search scope continuum indicated here in FIG. 6, the search scope may include the user device 102 and the device and user remote storage 608.

The search scope may be viewed as increasing from the individual file 604 level having a narrow scope towards the broadest scope of the Internet 606. However, in some implementations, different search scope settings may incorporate different sets of data 114. For example, the narrow search scope may be configured to include only local notes on the user device 102 while the broad search scope may be configured to omit local notes on the user device 102.

The user interface 600 may also present one or more registration selection controls 610. As described above, the user 104 or an administrator may select particular indices or other data for inclusion or exclusion in the unified search. Registration of indices or other data 114 may be manual, such as with the user interface 600, or automatic.

In this illustration, the registration selection controls 610 are depicted as checkboxes, allowing the user 104 to select or deselect particular applications and associated data for inclusion in the unified search. As shown here, the user 104 has chosen to register specific applications and has deselected the application of the e-Books stored on the server 112. As a result, the search results generated by the unified search module 218 will not include data from the e-Books stored on the server 112. However, when the scope is broad, such as set to Internet 606, results from an external search engine may be returned.

FIGS. 7-10 illustrate the persistence of the unified search interface 106 while different applications are presented. Also illustrated are the effects of the user 104 modifying the search scope by using the search scope control 506 as described above.

Figure 7:
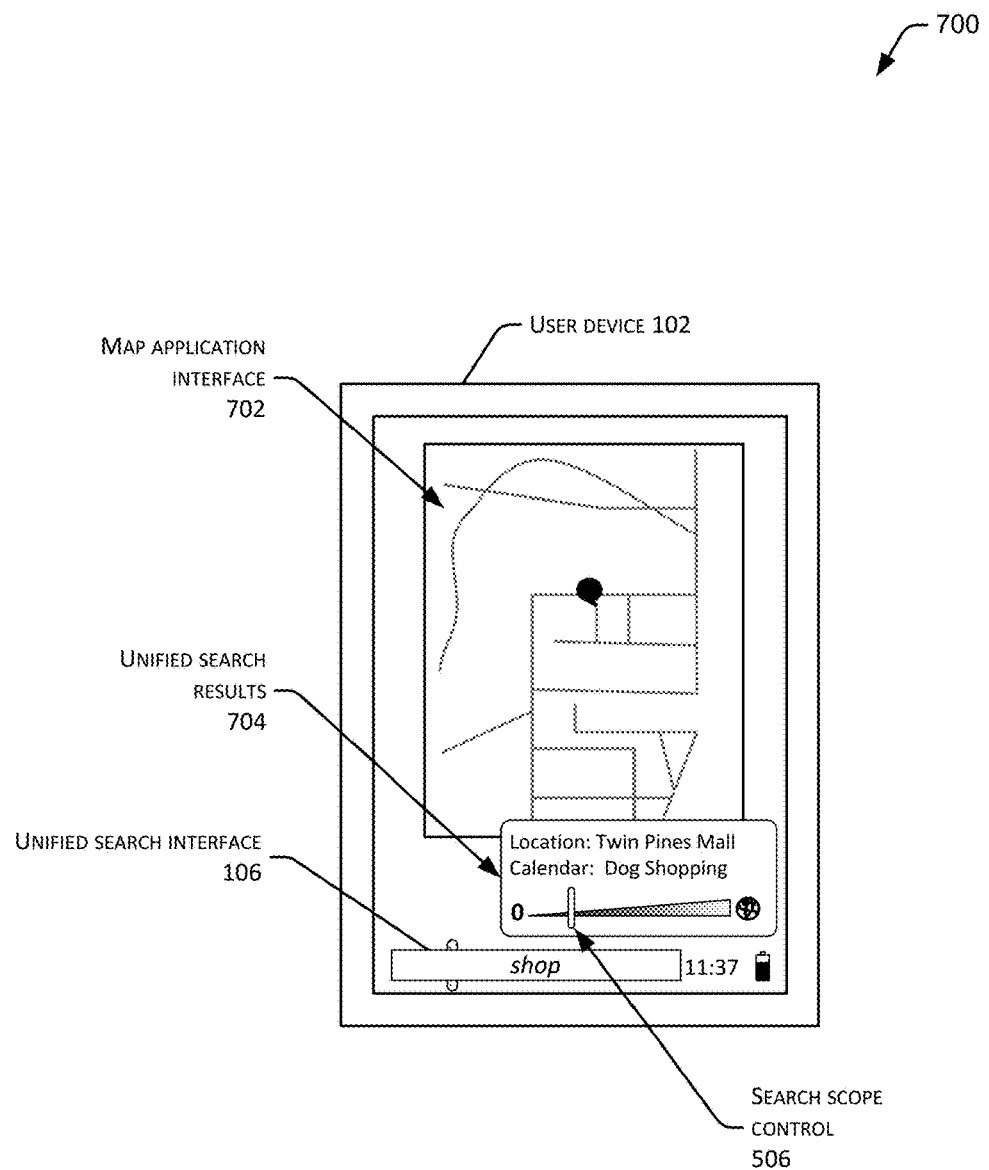
FIGS. 7-10 illustrate a persistent unified search interface when different applications are presented as well as a control to vary search scope.

FIG. 7 illustrates a user interface 700 in which a map application interface 702 is presented on the display 206 of the user device 102. In this illustration, the user 104 has entered the search term "shop" in the unified search interface 106 using the external keyboard 116. In some implementations, the unified search interface 106 may be presented on the display 206, or may be presented after the unified search helper module 238 has determined key events 232 that are designated to activate the unified search module 218 or unhandled by the map application 220. Using the techniques described above, the key events 232 entered while the map application 220 is in focus but are unhandled by the map application 220 may be delivered to the unified search module 218. The unified search module 218 may perform a search or query using the information provided by the key events 232.

Unified search results 704 as provided by the unified search module 218 are depicted as a pop-up or overlay window. The unified search results 704 are prioritized in this illustration to show results relating to the application that was in focus when the key inputs 118 were received in the unified search interface 106. For example, as illustrated in FIG. 7, the application focus was on the map application interface 702, presented on the display 206. The application focus indicates which application is currently configured to accept input from the user 104, such as from a touch sensor, external keyboard 116, mouse, and so forth. As a result, the unified search results 704 which relate to the map application 220, the map index 214(2), and the remote map index 314(1) are presented first. In some implementations, the first result on the unified search results 704 may be presented automatically.

In this illustration, the search scope control 506 has been set to a relatively narrow scope, which may correspond to returning data associated with local applications and not those accessible via the network 110. As a result, the unified search results 704 include the location of "Twin Pines Mall" and a calendar item for "Dog Shopping on Tuesday" as illustrated here. In some implementations, the user 104 may adjust the search scope control 506 to change the results presented in the unified search results 704.

Figure 8:
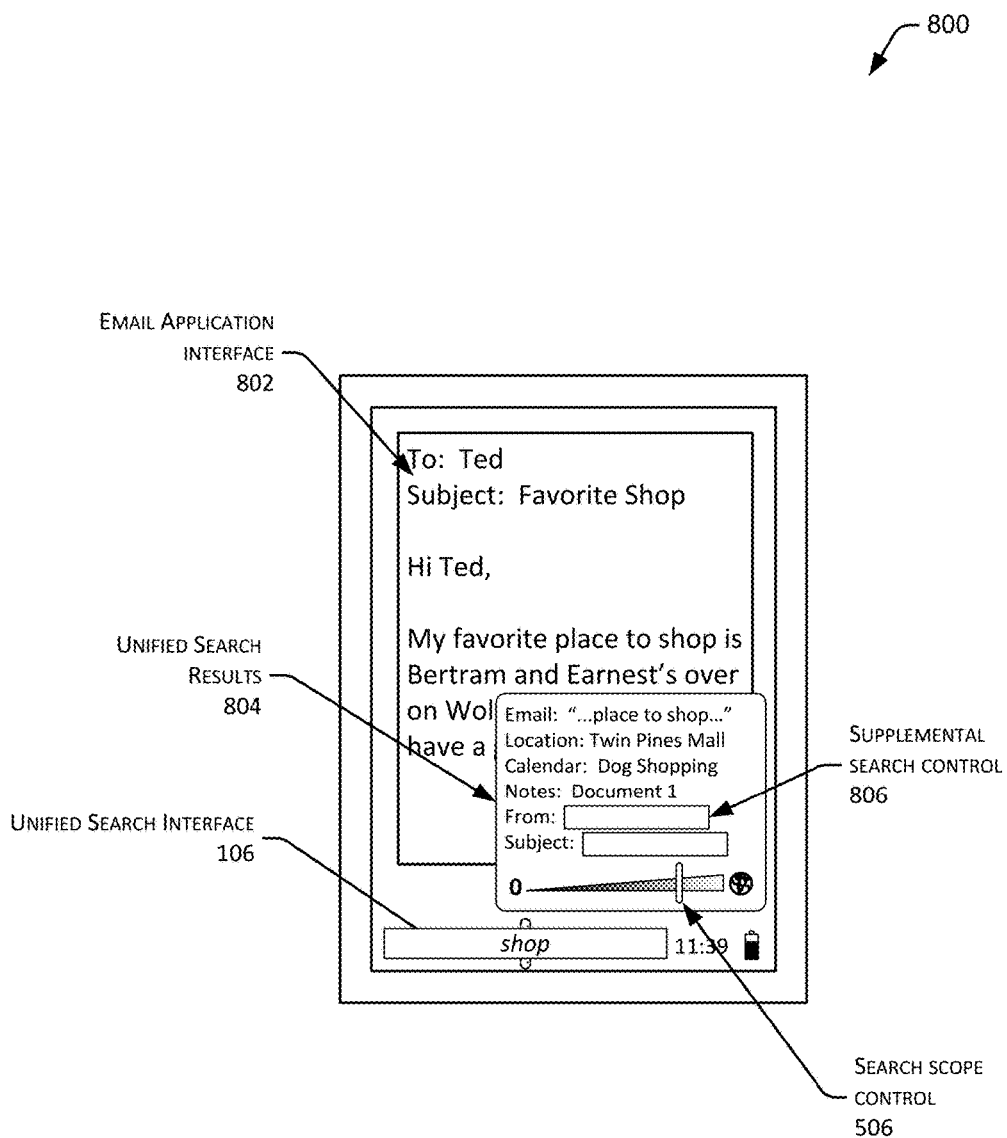

FIG. 8 illustrates a user interface 800 in which an email application interface 802 is presented on the display 206 of the user device 102. In this illustration, the user 104 has again entered the search term "shop" in the unified search interface 106. For example, the user 104 may enter the word "shop" using the external keyboard 116 as key inputs 118. The unified search helper module 238 may determine the key events 232 generated based on the key inputs 118 are to be provided to the unified search interface 106. Using the techniques provided above, the key events 232 produced at least in part while the email application 222 is in focus may be provided to the unified search module 218. As a result, the key inputs 118 provided by the user 104 are not lost and are used to execute the search.

Unified search results 804 as provided by the unified search module 218 may be depicted as a pop-up or overlay window. As above, the unified search results 804 are prioritized in this illustration to show results relating to the application other than the unified search module 218 that was previously in focus. Given that the email application 222 is now in use, the application focus is on the email application 222 and corresponding email application interface 802, which is presented on the display 206. As a result, the unified search results 804 which relate to the email application 222, the email index 214(3), and the remote email index 314(2) are presented first. In comparison, the unified search results 804 associated with the map application 220, which was in focus prior to the email application 222, are shown second, after the results associated with the email application 222.

In some implementations, supplemental search controls 806 may be provided. The supplemental search controls 806 provided may be determined based at least in part by the application prior to the unified search module 218 that was in focus. For example, as shown here, while in the email application 222, the supplemental search controls 806 may comprise specific search fields such as "From" and "Subject". In comparison, when the application focus was previously on the map application 220, the supplemental search control 806 may have comprised search fields such as a "Street Name" or "Maximum Driving Time." The supplemental search controls 806 may be specified by the application developer, the users 104, or both.

In comparison to FIG. 7, in this illustration at FIG. 8, the search scope control 506 has been set to relatively broad, which may correspond to returning data associated with local applications as well as some data accessible via the network 110. As a result, the unified search results 804 include a particular email, the location of "Twin Pines Mall, a calendar item for "Dog Shopping on Tuesday," and a note entitled "Document 1" which contains the text "shop."

Figure 9:
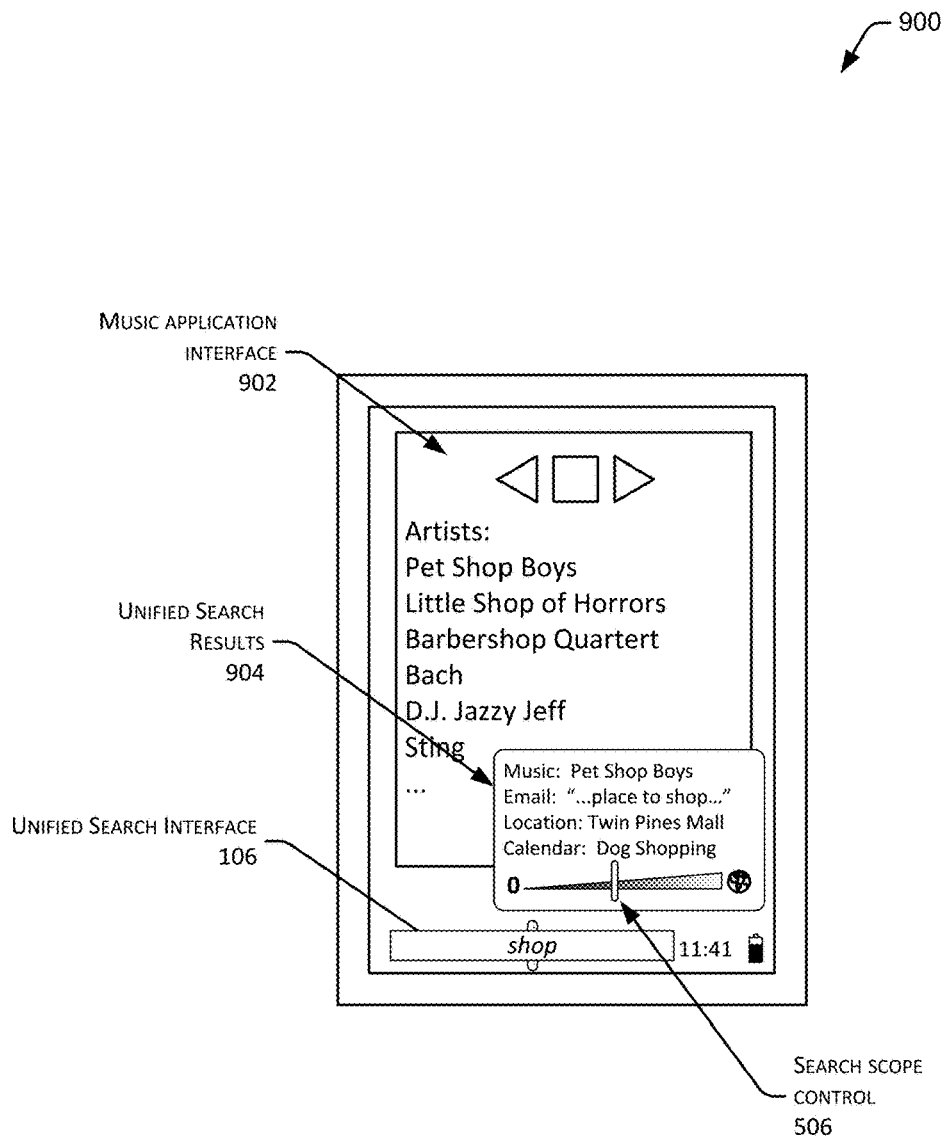

FIG. 9 illustrates a user interface 900 in which a music application interface 902 is presented on the display 206 of the user device 102. In this illustration, the user 104 has again entered the search term "shop" in the unified search interface 106. The key inputs 118 are passed as key events 232 using the techniques described above to the unified search module 218 that may provide the unified search interface 106. Unified search results 904 as provided by the unified search module 218 are depicted in FIG. 9 as a pop-up or overlay window. As above, the unified search results 904 are prioritized in this illustration to show results relating to the application that was in focus when the key events 232 were initially received. Given that the music application 224 was in use, the application focus was on the music application 224 and the input control focus was on the corresponding music application interface 902, which is presented on the display 206. As a result, the unified search results 904 relating to the music application 224, the music index 214(4), and the remote music index 314(3) are presented first. In comparison, results associated with the email application 222 which was previously in focus are shown second.

As compared to FIGS. 7 and 8, in this illustration, the search scope control 506 has been set to approximately the middle of the continuum, which may correspond to returning data associated with some local applications as well as some data accessible via the network 110. As a result of the setting of the search scope control 506, the unified search results 904 include music from the "Pet Shop Boys," a particular email, the location of "Twin Pines Mall", and a calendar item for "Dog Shopping."

Figure 10:
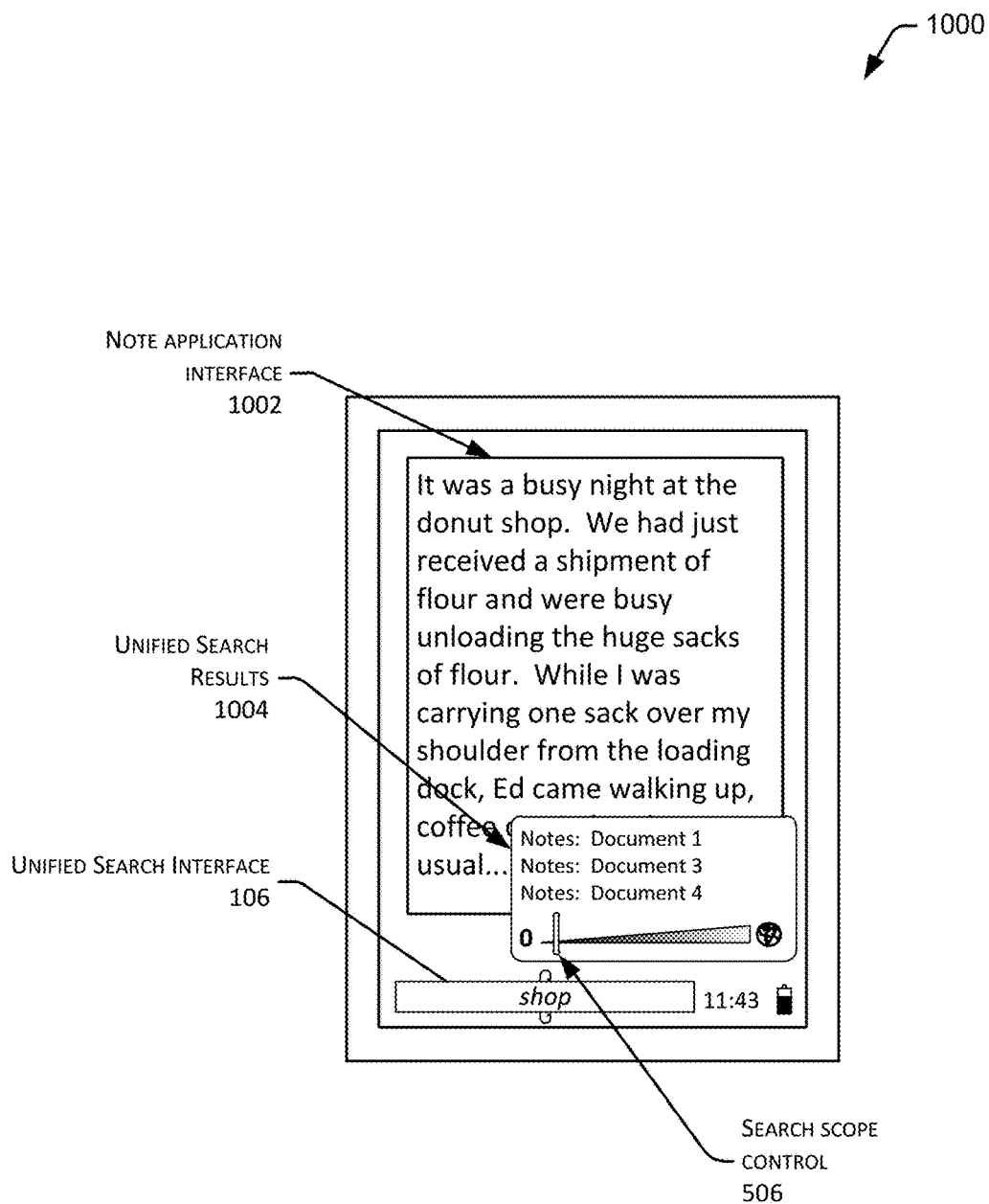

FIG. 10 illustrates a user interface 1000 in which a note application interface 1002 is presented on the display 206 of the user device 102. In this illustration, the user 104 has again entered the search term "shop" in the unified search interface 106. Unified search results 1004 as provided by the unified search module 218 are depicted as a pop-up or overlay window. As above, the unified search results 1004 are prioritized in this illustration to show results relating to the previous application focus. Given that the note application 226 was in use when the unified search module 218 was called, the previous application focus was on the note application 226 and the corresponding note application interface 1002 which is presented on the display 206 has the input control focus. As a result, the unified search results 1004 which relate to the note application 226 will be presented first.

In comparison to FIGS. 7-9, in this illustration, the search scope control 506 has been set to the narrowest end of the continuum, which may correspond to returning data associated with the application in focus before use of the unified search module 218. As a result, the unified search results 1004 are restricted only to the note application 226.

Illustrative Processes

Figure 11:
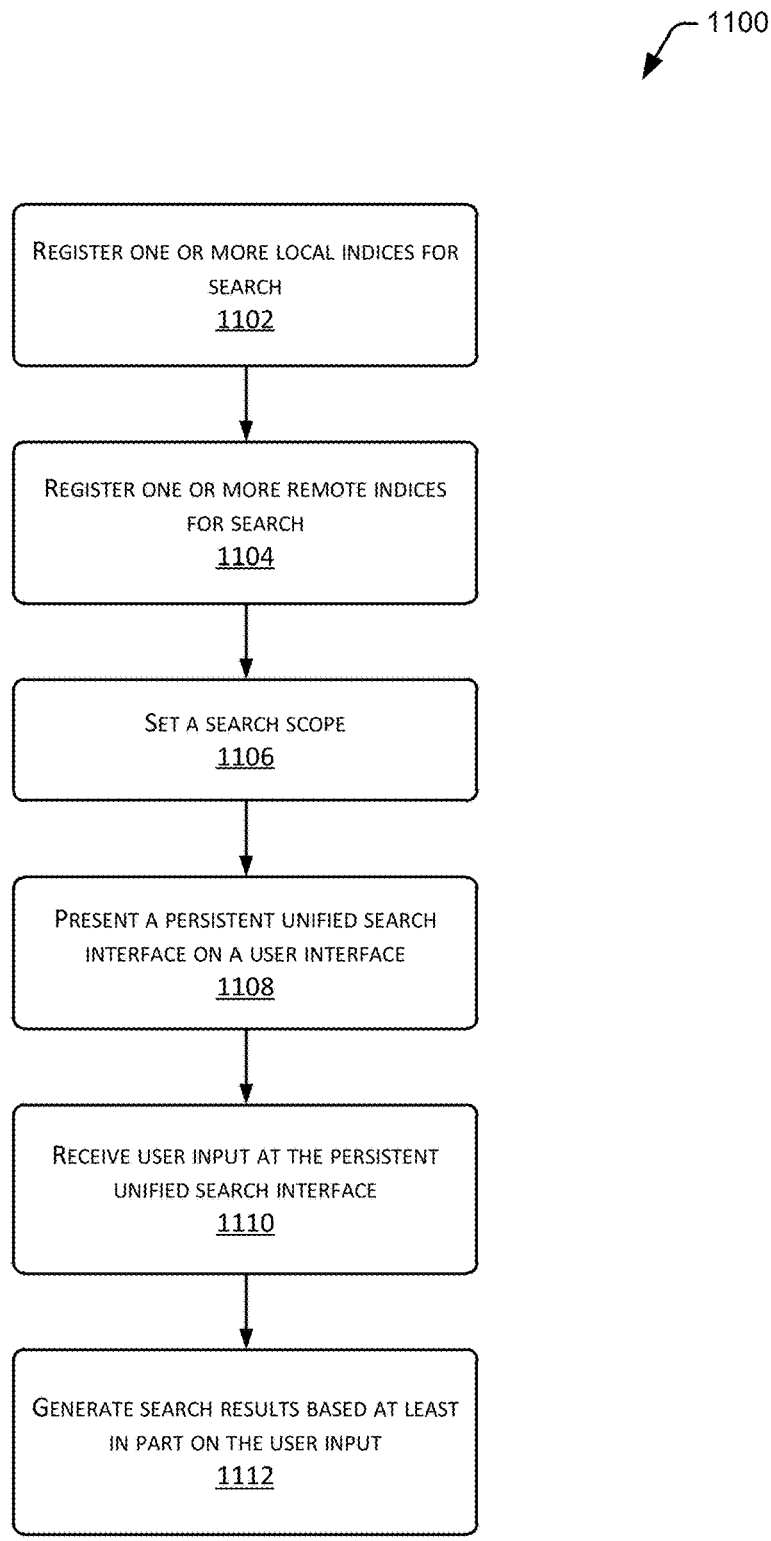
FIG. 11 illustrates a flow diagram of a process of providing search results based at least in part on user input via the unified search interface.

FIG. 11 illustrates a flow diagram of a process 1100 of providing search results based at least in part on user input via the unified search interface 106. This process may be implemented by the unified search module 218, 318, or both.

Block 1102 registers one or more local indices for search. For example, the unified search module 218 may maintain a list of searchable information. This list may comprise a register of one or more local indices associated with one or more applications. For example, the map index 214(2), the email index 214(3), the music index 214(4), and so forth, may be registered in the index of searchable information 214(1).

Block 1104 registers one or more remote indices accessible via the network interface which are associated with the one or more applications. For example, a remote map index 314(1), a remote email index 314(2), a remote music index 314(3), a remote note index 314(4), a remote browser index 314(5), and other data 314(D) may be registered in the index of searchable information 214(1).

Block 1106 sets a search scope. This may be a default value, such as set with the default search scope setting 602 or adjusted by the search scope control 506.

Block 1108 presents on the display 206 the persistent unified search interface 106. The persistent unified search interface 106 may be configured to remain on the display 206 or may be configured to appear responsive to input of one or more key events 232. For example, the unified search interface 106 may be presented upon entry of particular keystrokes made to an external keyboard 116. As a result, the unified search interface 106 is presented in addition to or concurrently with an application user interface 108 or other user interface. The unified search interface 106 may include a search scope control 506 configured to modify the search scope.

Block 1110 receives user input at the persistent unified search interface 106. For example, the user 104 may enter via an external keyboard 116 or touchscreen the word "shop." The input may also include the user 104 setting the search scope control 506.

Block 1112 generates search results based at least in part on the user input and the searchable information. As described above, the searchable information may include the one or more local indices, the one or more remote indices, documents, and so forth. As described above, in some implementations, the search may be constrained by the search scope, or the search results may be constrained by the search scope.

Figure 12:
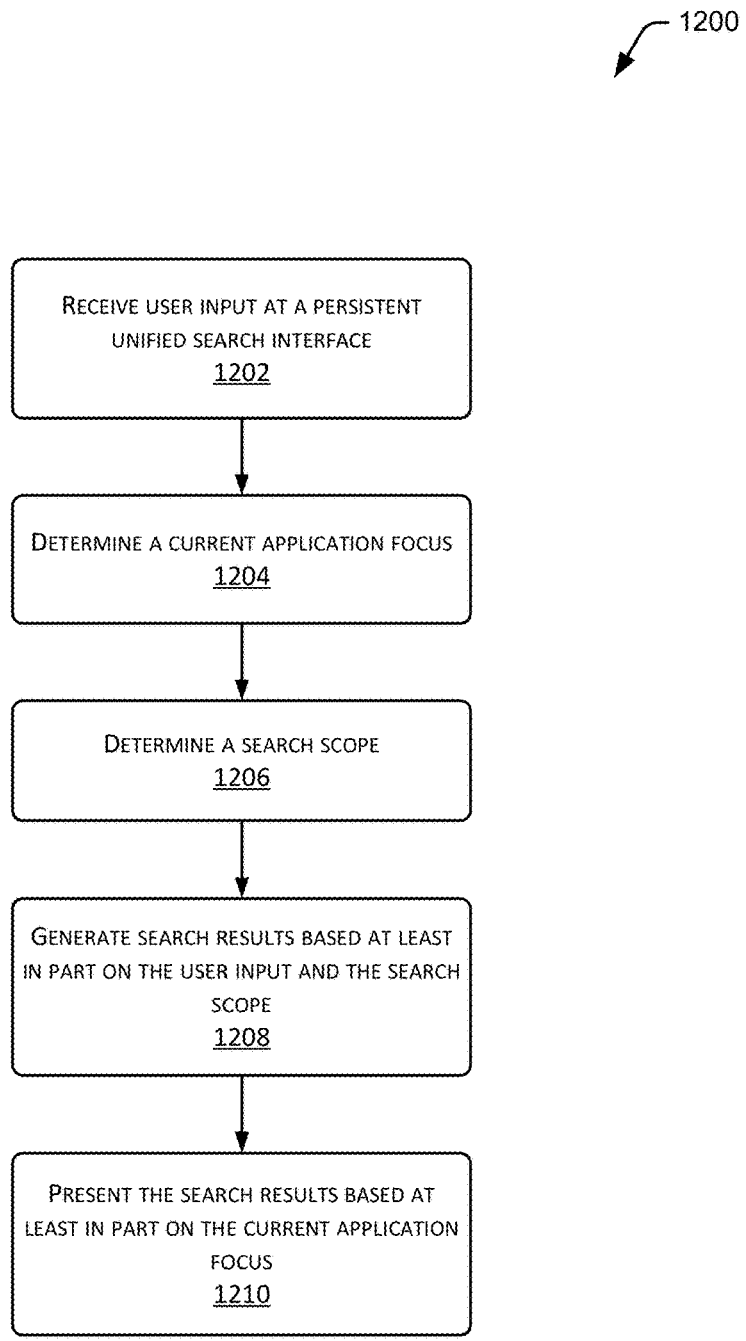
FIG. 12 illustrates a flow diagram of a process of providing search results from a unified search interface based at least in part on a current application focus.

FIG. 12 illustrates a flow diagram of a process 1200 of providing search results from a unified search interface 106 based at least in part on a last application focus. This process may be implemented by the unified search module 218, 318, or both.

Block 1202 receives user input at the persistent unified search interface 106. For example, the user input may comprise text, such as the user 104 may enter the word "shop" into the search term entry control 504. As described above, the unified search interface 106 may be configured to persist. For example, the unified search interface 106 may be part of a desktop user interface.

Block 1204 determines a current application focus. As described above, the application focus indicates an application in the foreground which is configured to interact with a user 104.

Block 1206 determines a search scope. As described above, the search scope may be retrieved from a default setting or be based at least in part on a user input from the search scope control 506 of the unified search interface 106.

Block 1208 generates search results based at least in part on the user input. In some implementations, the search results may also be generated based at least in part on the search scope.

Block 1210 presents the search results based at least in part on the current application focus before the application focus transitioned to the unified search module 218. In some implementations, the search results may be presented by sorting such that the search results associated with the last application focus are presented at a beginning of the search results. For example, the search results associated with the current application in focus may be presented first.

Figure 13:
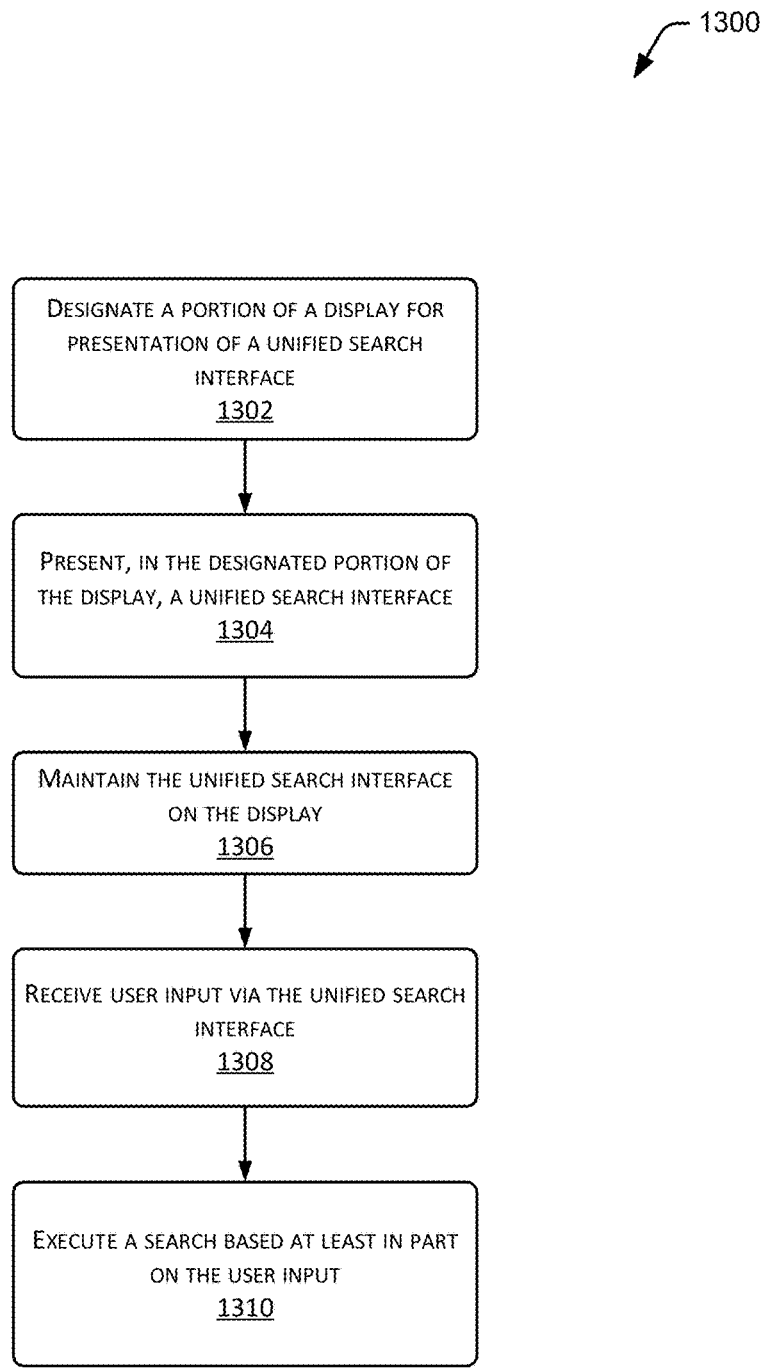
FIG. 13 illustrates a flow diagram of a process of generating the unified search interface.

FIG. 13 illustrates a flow diagram of a process 1300 of generating the unified search interface 106. This process may be implemented at least in part by one or more of the OS module 212, the user interface module 216, or the unified search module 218.

Block 1302 designates a portion of the display 206 for presentation of a unified search interface 106. For example, the bottom half-inch of the display 206 may be designated as the region to present the unified search interface 106. In some implementations, the designated portion of the display 206 for presentation of the unified search interface 106 remains fixed.

Block 1304 presents, in the designated portion of the display 206, the unified search interface 106. Block 1306 maintains the unified search interface 106 on the display 206. For example, as the display 206 may be redrawn to adjust for changes as applications move from the foreground to the background. The unified search interface 106 may comprise a search scope control 506 configured to allow adjustment of the search scope.

Block 1308 receives user input via the unified search interface 106. In some implementations, the user input may comprise one or more gestures detected by a touch sensor, text entered on a keyboard, and so forth. For example, the user 104 may enter the search term "shop" in the search term entry control 504.

Block 1310 executes a search based at least in part on the user input. For example, the unified search module 218 may be configured to execute the search for the "shop" search term entered by the user 104. In some implementations, the search may be based at least in part on the search scope.

Figure 14:
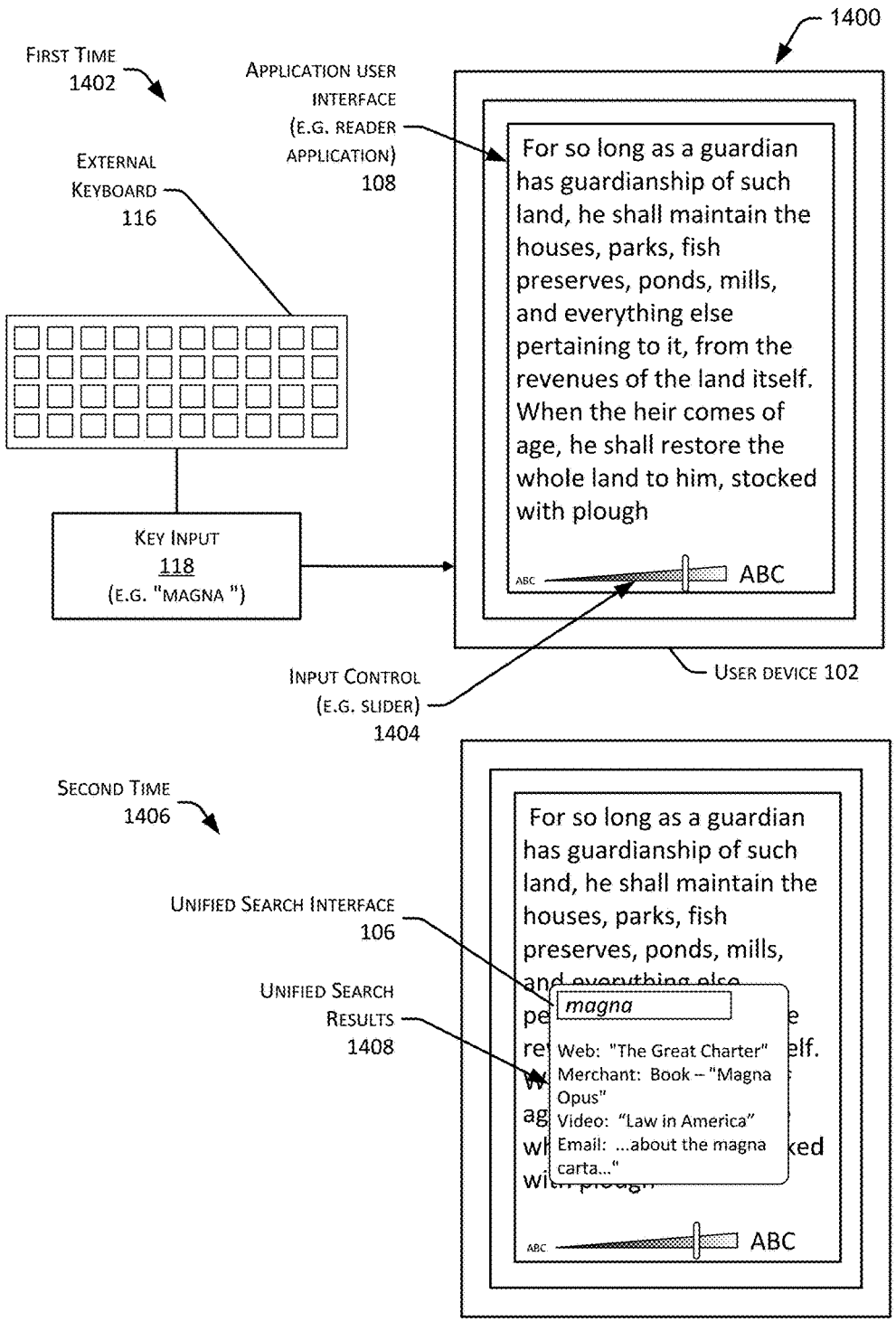
FIG. 14 is an illustrative user interface comprising the unified search interface as initiated by one or more key events resulting from key inputs made using an external keyboard.

FIG. 14 illustrates user interfaces 1400 before and after the unified search interface 106 as initiated by one or more key events 232 resulting from key inputs 118 made using an external keyboard 116. At a first time 1402, the user device 102 is presenting an application user interface 108. For example, the user 104 may be reading text in the Internet browser application 228 or an eBook reader application. The unified search interface 106 is not visible on the display 206 at this time. The unified search module 218 may or may not be executing at this time on the processor 202.

Depicted in this illustration at the first time 1402 is an input control 1404. For example, the input control 1404 shown here is a slider that may be used to adjust a size of the text presented in the application user interface 108. The input control 1404 of the slider may also be configured to process key events 232 such as left and right arrow keys but would otherwise be nonresponsive to printable characters such as alphabetic or numeric keys.

The user 104 may begin to type on the external keyboard 116. The external keyboard 116 may be wired or wirelessly connected to the user device 102. For example, the external keyboard 116 may be connected to the user device 102 using a Bluetooth network interface. The external keyboard 116 generates key input 118 data indicative of the activation of one or more of the buttons, such as a stream of "raw" data indicative of the key presses. The key inputs 118 may be processed by the OS module 212 to generate key events 232. For example, as shown here, the user 104 may begin typing the text string "magna".

The unified search helper module 238 may begin processing the key inputs 118 immediately and individually, without waiting for the user 104 to complete entry of a word, activate a search control, and so forth. The unified search helper module 238 may determine that the key events 232 generated from the key inputs 118 are unhandled by the current application, such as the reader application, or an input control 1404 thereof, such as the slider. The unified search helper module 238 may execute or load the unified search module 218. For example, the first key event 232(1) representing the letter "m" is not handled by the input control 1404 that is in focus. As a result, the unified search module 218 may be started. The first key event 232(1) may be stored using the window manager service 244. When the unified search module 218 is not executing on the processor 202, the window layout module 242 may execute the unified search module 218. Meanwhile, the user 104 may continue to generate subsequent key events 232(2)-(5) representative of the letters "a", "g", "n", "a". These subsequent key events 232(2)-(5) may be stored in an input queue associated with the unified search module 218.

At a second time 1406, the unified search module 218 has completed loading and is executing on the processor 202 and ready to accept input. The input control focus has now transitioned to the unified search interface 106 text box that is configured to accept text. The view implementer module 246 may query the window manager service 244 for the stored first key event 232(1) "m", which may then be provided to the input control 1404 in focus of the unified search interface 106. Once the first key event 232(1) has been delivered, the subsequent key events 232(2)-(5), which have been waiting in the input queue, may be delivered.

As a result of these techniques, the user 104 may begin typing regardless of the application they are using. The data entered by the user 104 is maintained and then provided to the unified search module 218, regardless of which application, module, or input control 1404 happens to be in focus. For example, as the user 104 types using individual keys on the external keyboard 116, the unified search module 218 may begin processing that input. As described above, the OS module 212 or an application may be configured to process the key inputs 118 and the corresponding key events 232 such that inputs made before focus of the application has been established, before the unified search module 218 is available to accept inputs, and so forth, are properly routed to the unified search module 218.

Continuing the discussion with regard to the second time 1406, the application user interface 108 depicts the unified search interface 106 that is presented on the display 206, and unified search results 1408. The unified search results 1408 are dynamic, in that as the user 104 enters input on the external keyboard 116, the search of the unified search module 218 is updated. For example, the unified search results 1408 may include items available from a merchant, such as books, merchandise, tangible items, digital content, and so forth. As a result, the user 104 may quickly access information without having to explicitly invoke the unified search module 218.

In another implementation (not depicted), the unified search interface 106 may be omitted or otherwise not presented. For example, only the unified search results 1408 may be presented on the display 206.

Figure 15:
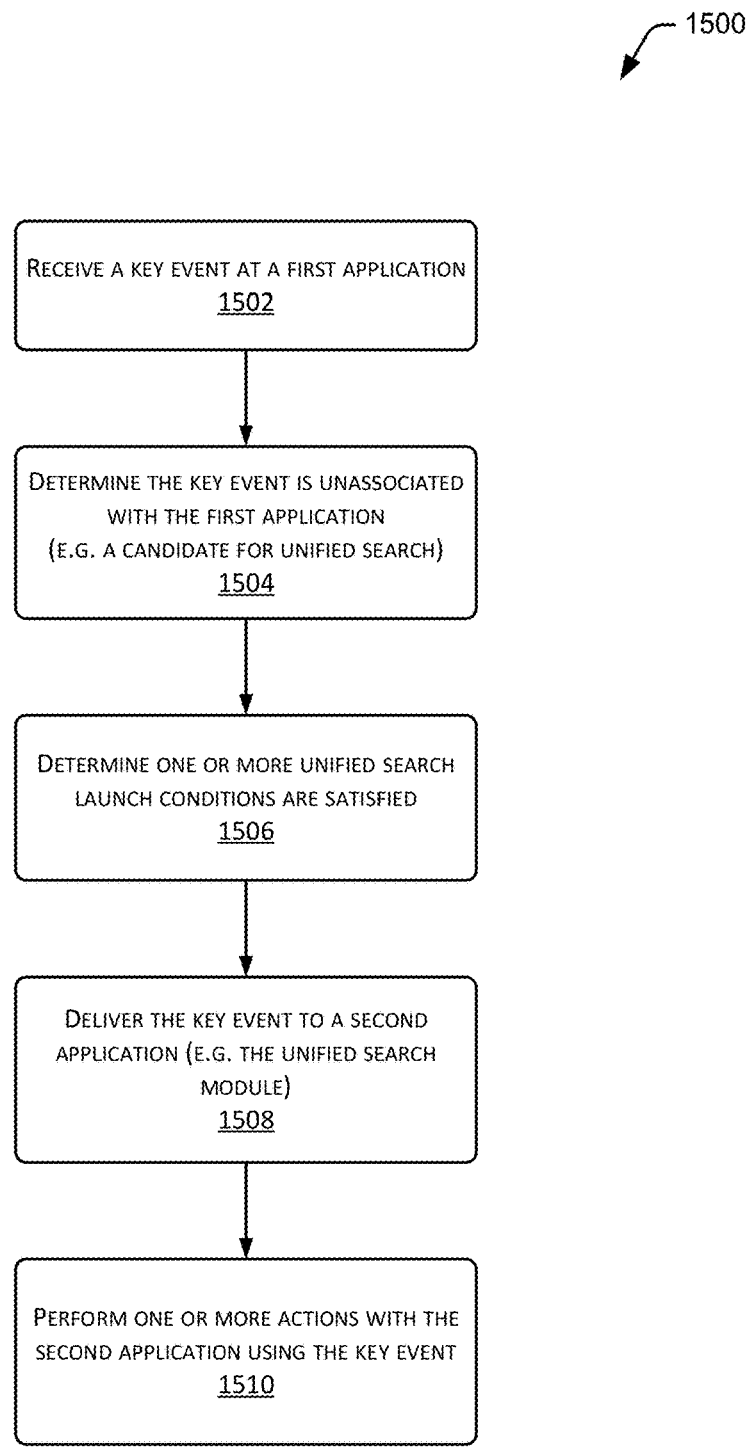
FIG. 15 illustrates a flow diagram of a process of handling the one or more key events to initiate the unified search.

FIG. 15 illustrates a flow diagram 1500 of a process of processing key inputs 118 to initiate the unified search. In some implementations, the process may be performed at least in part by one or more of the modules described in FIGS. 2A and 2B.

Block 1502 receives one or more key events 232 while a first application is in focus. For example, while reading using an eBook reader application, the user 104 may begin to type a title of a book into an external keyboard 116 connected via Bluetooth to the user device 102. One or more key events 232 are generated based on the key inputs 118.

Block 1504 determines one or more of the key events 232 are unassociated with the first application. Continuing the example, the first key event 232(1) may be unassigned or otherwise unused by the eBook reader application. This unassociated or unhandled first key event 232(1) becomes a candidate for the unified search. The determination of block 1504 is described in more detail below with regard to FIG. 16.

Block 1506 determines that one or more of the unified search launch conditions 240 are satisfied. The unified search helper module 238 or another module may be configured to launch or execute the unified search module 218 when one or more of the unified search launch conditions 240 have been met. As described above, the unified search launch conditions 240 may include, but are not limited to, whether the user device 102 is in use by a person designated as a child, whether the user device 102 is executing in a demonstration mode, whether the application currently in the foreground is configured to use the unified search, whether a certain number of key events 232 have occurred within a specific time, and so forth. For example, when the user 104 logged into the user device 102 is below a threshold age, the functionality of the unified search module 218 may be unavailable. In another example, the unified search helper module 238 may be configured to initiate the unified search when a certain number of key events 232 have been received in a specified period of time. Continuing the example, the unified search launch conditions 240 may be deemed satisfied sufficient to launch the unified search module 218 when there are more than four key events 232 received within a 1 second window.

Block 1508 delivers the one or more key events 232 to a second application. Continuing the example, responsive to the determination that one or more of the key events 232 are unassociated with the first application, the second application may be executed or brought into focus. The second application may comprise the unified search module 218, and the key events 232 may be provided to an input control in the unified search interface 106, such as a text box to enter a query string. The delivery of the one or more key events 232 is discussed in more detail below with regard to FIG. 17.

Block 1510 performs one or more actions with the second application using the key event 232. Continuing the example, the unified search module 218 may execute a query using the data provided by the one or more key events 232.

Figure 16:
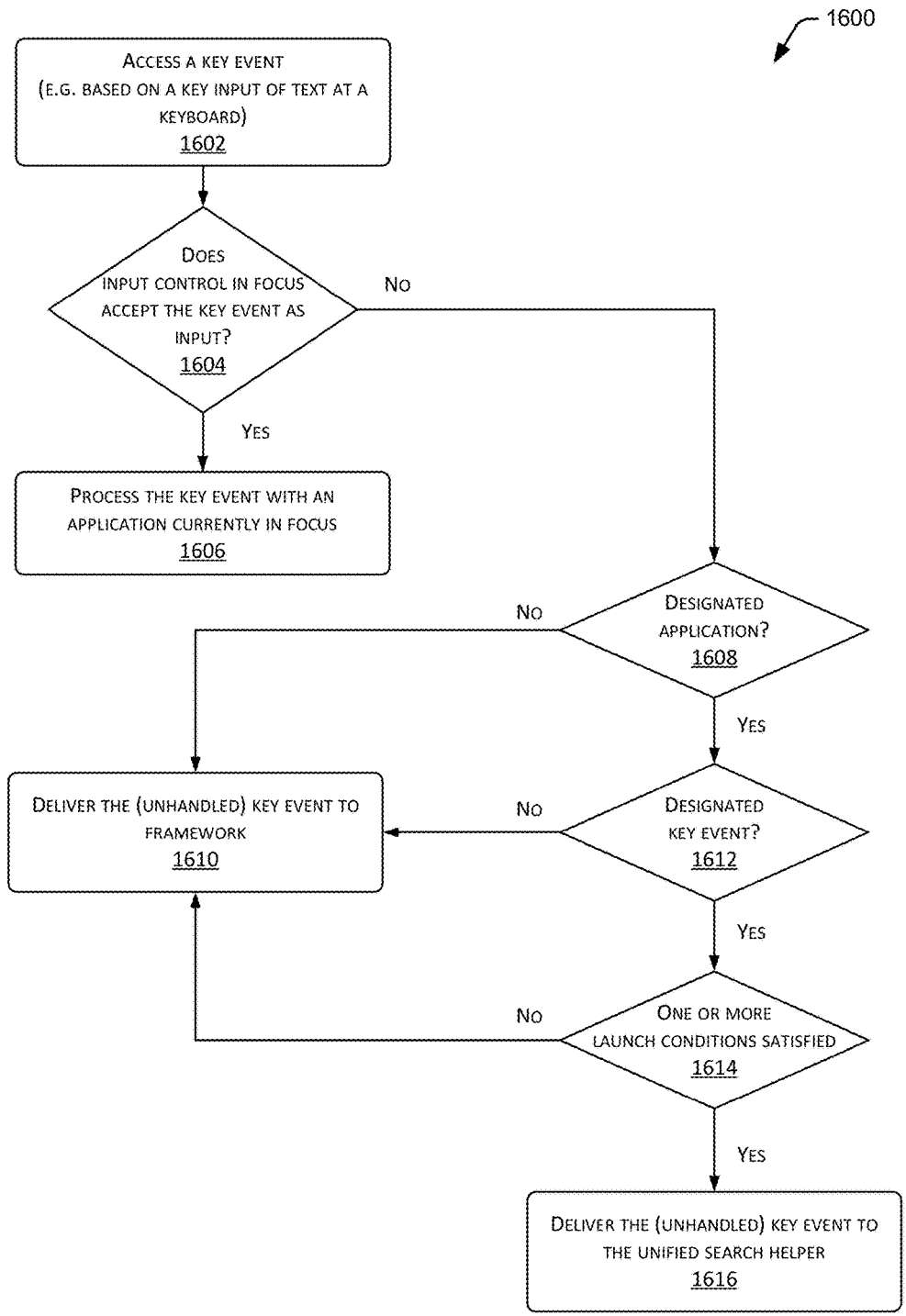
FIG. 16 illustrates a flow diagram of a process of determining the one or more key events are to initiate the unified search.

FIG. 16 illustrates a flow diagram 1600 of a process of determining the one or more key events 232 are to initiate the unified search. In some implementations, the process may be performed at least in part by one or more of the modules described in FIGS. 2A and 2B.

Block 1602 accesses one or more key events 232. For example, a first key input 118(1) may be received from the user 104 with the external keyboard 116 and used to generate a first key event 232(1). In another implementation, the first key input 118(1) may be received from the user 104 with the virtual or "soft" keyboard presented on the display 206. The OS module 212 may generate a first key event 232(1) from the key input 118.

Block 1604 determines when a first input control 1404 of the first application has input focus and if the first input control 1404 is able to accept the first key event 232(1) as input. While in focus, the input control 1404 is designated to receive input. In comparison, the input control 1404 not in focus may not receive the input. For example, the input control 1404 may not be in focus because an application is still starting up, no input controls 1404 are presented by the user device 102, and so forth. The type of input control 1404, configuration by a developer, or other factors, may specify what input the input control 1404 is able to accept and process.

In some implementations, the determination that the first input control 1404 is able or unable to accept the first key event 232(1) as an input may be responsive to receiving a callback from the first application or other data indicating that the first key event 232(1) is unhandled. For example, the first application may make a callback to the AOSP framework indicating the first key event 232(1) is unhandled.

When block 1604 determines the input control 1404 is in focus and can accept the first key event 232(1), the process may proceed to block 1606. When block 1604 determines the input control 1404 is not in focus or cannot accept the first key event 232(1), the process may proceed to block 1608. For example, the input control 1404 may comprise a slider configured to accept a key event 232 of an arrow key, while the first key event 232(1) may represent alphanumeric text that the input control 1404 is unable to process.

Block 1606 processes the first key event 232(1) with the application currently in focus. For example, where the first key event 232(1) comprises a control character, the control character may be processed by the first application. When the first application that is in focus is unable to process the first key event 232(1), the first key event 232(1) may be discarded.

Block 1608 determines if the application is designated as using the unified search module 218. For example, the application may use the metadata described above to opt in or out of the use of the unified search module 218. Block 1608 may access this metadata to make the determination.

When block 1608 determines the application has opted out of use of the unified search module 218, such as when the application may use an application specific search, the process may proceed to block 1610. When block 1608 determines the application is designated as using the unified search module 218, the process may proceed to block 1612.

Block 1610 delivers the (unhandled) first key event 232(1) to the framework. For example, the first key event 232(1) may be processed by another module or portion of the OS module 212. In some implementations, the framework may discard or disregard the (unhandled) first key event 232(1).

Block 1612 determines when the first key event 232(1) corresponds to the designated key event data 248. For example, the designated key event data 248 may be searched or compared with the first key event 232(1) to determine a match. As described above, the designated key event data 248 may designate those key events 232 associated with use of the unified search module 218. When block 1612 determines the first key event 232(1) does not correspond to the designated key event data 248, the process may proceed to block 1610. When block 1612 determines the first key event 232(1) does correspond to the designated key event data 248, the process may proceed to block 1614.

Block 1614 determines when one or more of the unified search launch conditions 240 are satisfied. As described above, the unified search launch conditions 240 may include, but are not limited to, whether the user device 102 is in use by a person designated as a child, whether the user device 102 is executing in a demonstration mode, whether the application currently in the foreground is configured to use the unified search, whether a certain number of keystrokes have occurred within a specific time, and so forth.

When block 1614 determines the one or more unified search launch conditions 240 are not satisfied, the process may proceed to block 1610. When block 1614 determines the unified search launch conditions 240 are satisfied, the process may proceed to block 1616.

In one implementation, the unified search launch conditions 240 may specify a threshold indicating a count of the number of unhandled key events 232 before invoking the unified search module 218. For example, the threshold may specify that occurrence of a single unhandled key event 232 is sufficient for the process to proceed. The threshold may specify an integer value greater than zero. In another example, the threshold may specify that occurrence of three unhandled key events 232 is sufficient for the process to proceed and the unified search (or another application) is to be used. The threshold may be specified based on input from the user 104, by an administrator, developer, and so forth. The count of the number of unhandled key events 232 may be reset after the conclusion of the process, upon expiration of a timer, or on another condition.

Continuing the example, when block 1614 determines the count of the number of unhandled key events 232 is less than the threshold, the process may continue to store the one or more unhandled key events 232 in a buffer or other storage location until the timer expires or the threshold is reached or exceeded.

Block 1616 delivers the (unhandled) first key event 232(1) to the unified search helper module 238. In other implementations, the first key event 232(1) may be delivered or otherwise provided to other modules.

Figure 17:
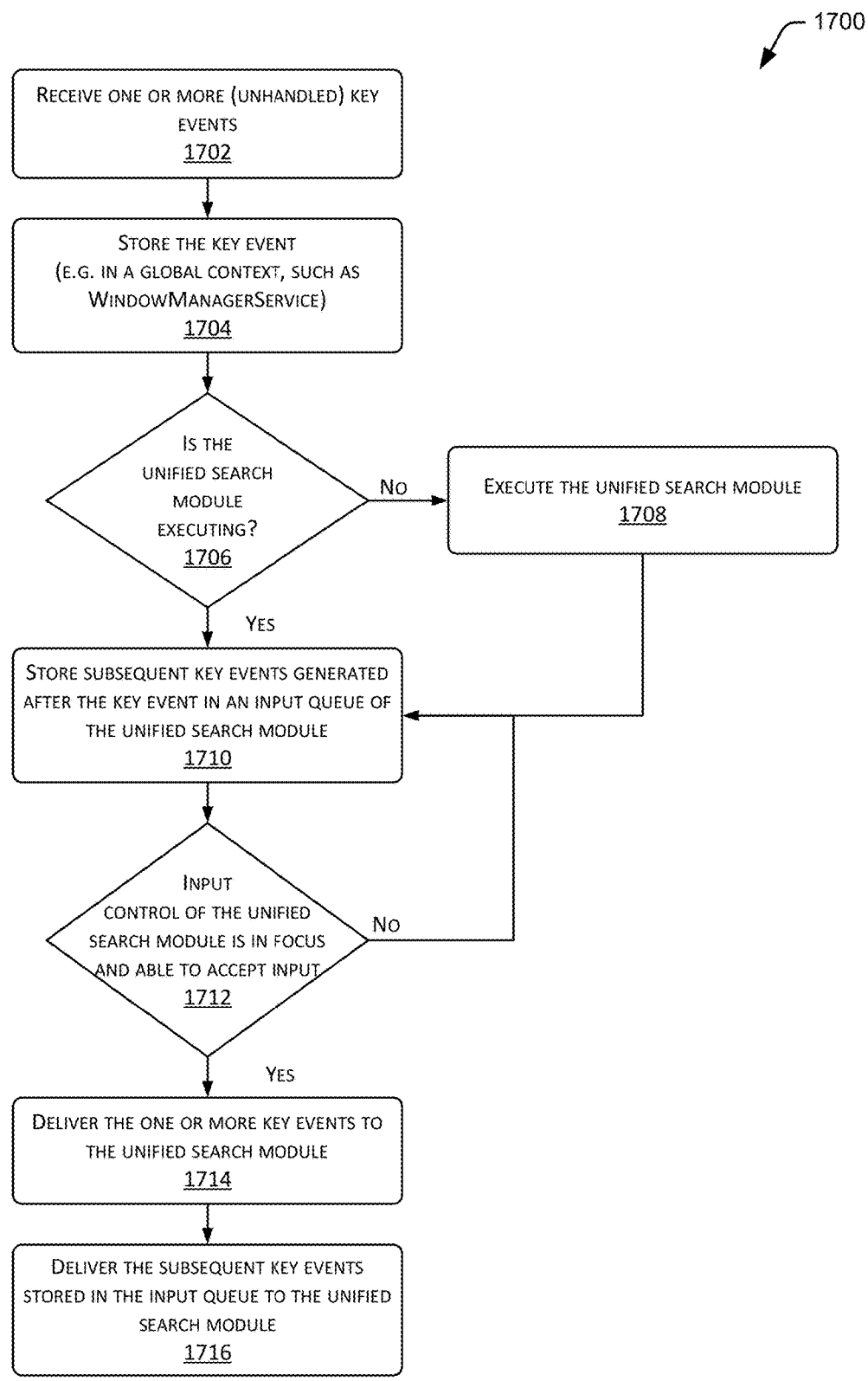
FIG. 17 illustrates a flow diagram of a process of delivering key events to the unified search module.

In some implementations, one or more of the blocks described in FIGS. 15-17 may be omitted, or the arrangement thereof may be modified.

FIG. 17 illustrates a flow diagram 1700 of a process of delivering key events 232 to the unified search. In some implementations, the process may be performed at least in part by one or more of the modules described in FIGS. 2A and 2B.

Block 1702 receives or otherwise accesses one or more unhandled key events 232. For example, the first key event 232(1) as determined above to be unhandled with regard to FIG. 16 may be accessed.

Block 1704 stores the key event 232. The first key event 232(1) may be stored in a global context or a storage location in memory that is accessible to other applications or processes executing on the processor 202. In one implementation, the first key event 232(1) may be stored using the window manager service 244. For example, the first key event 232(1) may be stored in the view hierarchy of the AOSP framework having a global context. In another example, the first key event 232(1) may be stored using a WindowManagerService.java module.

Block 1706 determines when the unified search module 218 is executing. The unified search module 218 may be determined to be executing when the unified search module 218 has one or more processes executing on the processor 202. During execution, the unified search module 218 may be executing in a foreground or a background of the operating system. In one implementation, the determination that the unified search module 218 is executing may be made by determining if a process identifier in the OS module 212 previously identified as being the unified search module 218 is listed as being operational. When block 1706 determines the unified search module 218 is not executing, the process may proceed to block 1708.

Block 1708 executes, loads, or otherwise activates the unified search module 218. For example, the unified search helper module 238 may launch or start the unified search module 218. Some period of time may elapse between instruction to execute the unified search module 218 and when the unified search module 218 is ready to accept and process input. For example, the unified search module 218 may take between about 300 ms to 1000 ms from a "cold start" until it is ready to accept input. In one implementation, the execution of the unified search module 218 may be initiated by a PhoneWindow.java module.

In some implementations, another block (not depicted) may be used to deal with the situation where the unified search module 218 is unexpectedly slow to become available. Such a delay may result in the unified search module 218 entering an application not responding (ANR) condition. The user device 102 may include a clock. Using data from the clock, an elapsed time since the unified search module 218 was executed may be determined. It may be determined the elapsed time exceeds a threshold time limit. For example, the threshold time limit may be 1500 ms. When the threshold time limit is met or exceeded by the elapsed time, execution of the unified search module 218 may be killed, suspended, terminated, restarted, and so forth.

When block 1706 determines the unified search module 218 is executing, the process may proceed to block 1710. Block 1710 stores subsequent key events 232(2)-(K) generated after the first key event 232(1). Block 1710 may store the subsequent key events 232(2)-(K) in an input queue associated with the unified search module 218. For example, after the OS module 212 receives the instruction to execute the unified search module 218, the OS module 212 may instantiate and assign an input queue for the use of the unified search module 218. The subsequent key events 232(2)-(K) may then be stored in this input queue.

Block 1712 determines when an input control 1404 of the unified search module 218 is in focus and able to accept the input. For example, the unified search module 218 may be executing and ready to process input, and the input control 1404 may be ready to accept key events 232 for use in executing a query. Continuing the example, the input method manager 234 may indicate the input control focus is now on the input control 1404 of the unified search module 218. In some implementations, such as where the unified search module 218 is already executing, the determination may be based on the change in focus to the unified search module 218. When block 1712 determines the unified search module 218 is not in focus or is not able to accept input, the process may return to block 1710. When block 1712 determines the unified search module 218 is in focus and able to accept input, the process may proceed to block 1714.

Block 1714 delivers the one or more key events 232 as stored in the global context to the unified search module 218. For example, the first key event 232(1) stored using the window manager service 244 may be retrieved and provided to the unified search module 218. In some implementations, the view implementer module 246 may be used to query and retrieve the first key event 232(1). For example, a ViewRootImpl.java module may be used store the subsequent key events 232(2)-(K).

Block 1716 delivers the subsequent key events 232(2)-(K) stored in the input queue to the unified search module 218. For example, responsive to the retrieval of the first key event 232(1), the subsequent key events 232(2)-(K) may be retrieved from the input buffer in a first-in-first-out fashion. The storage of the subsequent key events 232(2)-(K) may be discontinued when the input method manager 234 reports binding is complete between the input and the unified search module 218.

Figure 18:
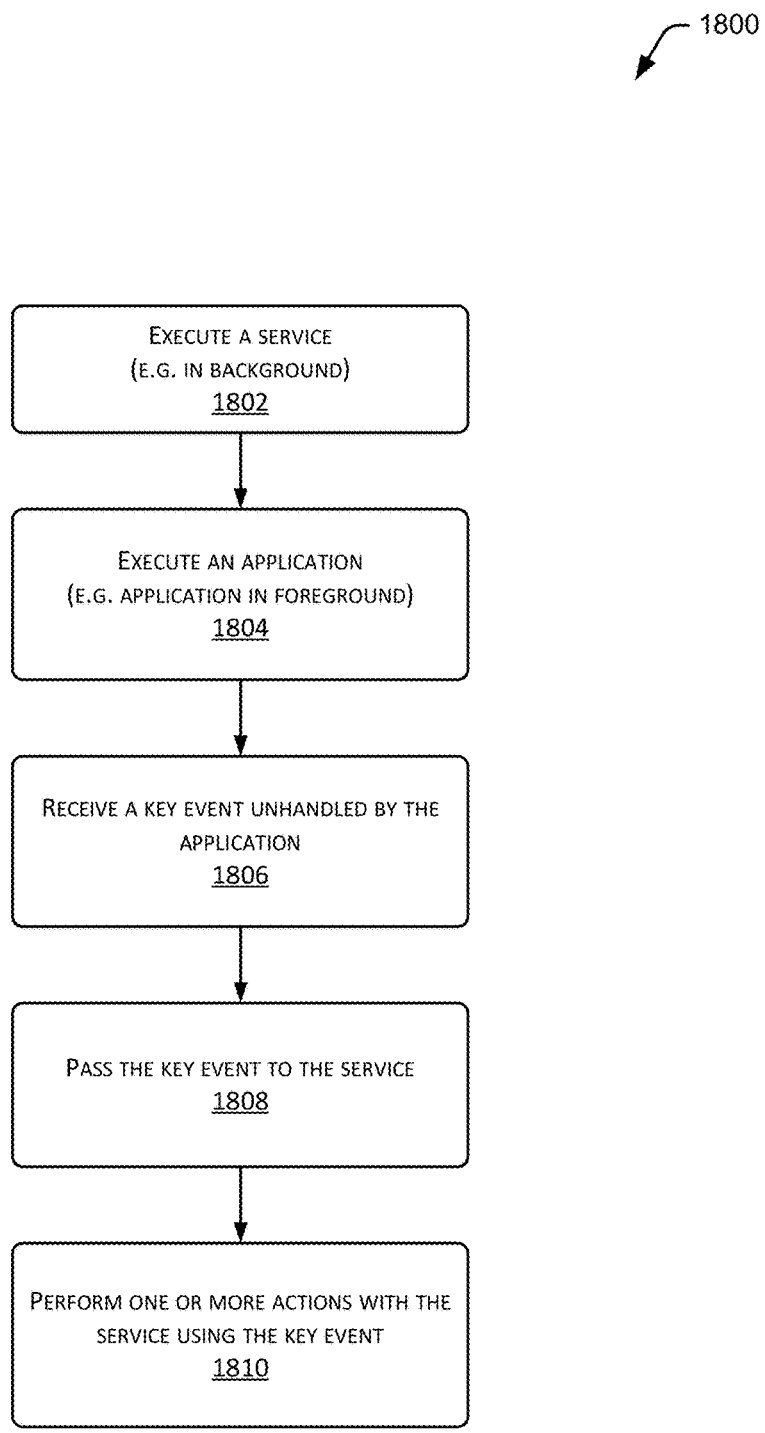
FIG. 18 illustrates a flow diagram of a process of delivering key events to the unified search module using a service.

FIG. 18 illustrates a flow diagram 1800 of a process of delivering key events 232 to the unified search module 218 using a service. In some implementations, the process may be performed at least in part by one or more of the modules described in FIGS. 2A and 2B.

Block 1802 executes one or more modules as a service. For example, the OS module 212 may execute one or more of the unified search module 218, unified search helper module 238, and so forth, as a service. The service may be configured to execute in the background, such that the service is not under the direct control of an interactive user 104. For example, where the OS module 212 implements the Android OS or variant thereof, the module may be executed using the "service" class.

Block 1804 executes an application. For example, the Internet browser application 228 may be executed. The application may be executing in the foreground, such that it is interactive with respect to the user 104.

Block 1806 receives a key event 232 that is unhandled by the application. For example, the Internet browser application 228 may not be configured to handle the key event 232 corresponding to the combination of control and "s" (CTRL+S).

Block 1808 passes the key event 232 to the service. For example, the key event 232 may be passed using interprocess communication (IPC) functionality of the OS module 212.

Block 1810 performs one or more actions with the service using the key event 232. For example, where the service comprises the unified search module 218, the search of one or more of the indices may be made using the key events 232 as a query value or search term.

CONCLUSION

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed in certain devices, software programs, processes, or entities, this need not be the case, and a variety of implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    at least one wireless network interface in communication with at least one external keyboard;
    at least one memory storing computer-executable instructions;
    at least one hardware processor coupled to the at least one wireless network interface, and the at least one memory, the at least one hardware processor configured to execute the computer-executable instructions to:
        generate first data indicating first input to the at least one external keyboard;
        determine that the first data is indicative of a printable character;
        determine a first input control of a first application has input focus;
        receive a callback from the first application configured to indicate that the first data is unhandled by the first input control;
        store the first data;
        store subsequent data generated after the first data in an input queue;
        determine that one or more unified search launch conditions are satisfied,
            wherein the one or more satisfied unified search launch conditions includes one or more of:
                the first data corresponds to an entry within designated data,
                the first application is configured to use a unified search component, or
                a number of inputs have occurred within a specific time;
        based on the one or more unified search launch conditions being satisfied and a second input control having the input focus, deliver the first data to the unified search component;
        based on the one or more unified search launch conditions being satisfied and the second input control having the input focus, deliver, after the first data is delivered to the unified search component, the subsequent data stored in the input queue to the unified search component;
        perform a search with the unified search component using data associated with the first data and the subsequent data; and
        present results of the search.

2. The system of claim 1, wherein the at least one hardware processor is further configured to execute the computer-executable instructions to:
    store the first data in a view hierarchy of a user interface for presentation, wherein the view hierarchy is maintained by a window manager service and provides a global context wherein the first data is accessible to other applications within the view hierarchy.

3. The system of claim 1, wherein the at least one hardware processor is further configured to execute the computer-executable instructions to:
    store the first data using a WindowManagerService.java component as implemented in an Android Open Source Project ("AOSP") environment;
    initiate execution of the unified search component using an instruction in a PhoneWindow.java component as implemented in the AOSP; and
    store the subsequent data using a ViewRootImpl.java component as implemented in the AOSP.

4. The system of claim 1, wherein the storing of the first data and the subsequent data is in a global context, and wherein the delivery of the first data and the subsequent data is from the global context.

5. A system comprising:
    at least one input device;
    at least one memory storing first and second computer-executable instructions;
    at least one hardware processor coupled to the at least one input device and the at least one memory, the at least one hardware processor configured to execute the first computer-executable instructions to:
        generate first data from one or more inputs to the at least one input device;
        determine input focus of a first input control of a first application;
        determine that the first input control is unable to accept the first data as input;
        store the first data;
        determine that the first application is configured to use a unified search component;
        execute the second computer-executable instructions based at least in part on the determination that the first input control is unable to accept the first data as input and the first application is configured to use the unified search component;
        generate subsequent data from additional one or more inputs to the at least one input device;
        store the subsequent data generated after the first data in an input queue;
        determine that the input focus is passed to a unified search component;
        cause execution of the unified search component; and
        based on a second input control of the unified search component having the input focus, deliver the first data and the subsequent data to the unified search component.

6. The system of claim 5, further comprising a Bluetooth wireless network interface coupled to the at least one hardware processor; and wherein the at least one input device comprises an external keyboard in communication with the at least one hardware processor using the Bluetooth wireless network interface.

7. The system of claim 5, further comprising at least one clock coupled to the at least one hardware processor and computer-executable instructions to:
determine, using data from the clock, an elapsed time since the unified search component was executed;
determine the elapsed time exceeds a threshold time limit; and
terminate execution of the unified search component.

8. The system of claim 5, wherein the storing of the first data and the subsequent data is in a global context, and wherein the delivery of the first data and the subsequent data is from the global context.

9. The system of claim 8, wherein the first data is stored using a WindowManagerService.java component and the at least one hardware processor is further configured to execute computer-executable instructions to:
cause execution of the unified search component using an instruction from a PhoneWindow.java component; and
store the subsequent data using a ViewRootImpl.java component.

10. The system of claim 5, wherein the storing of the first data and subsequent data are entered in an input queue of the unified search component.

11. The system of claim 5, wherein the at least one hardware processor is further configured to execute the first computer-executable instructions to:
store the first data in a view hierarchy of a user interface for presentation, wherein the view hierarchy is maintained by a window manager service and provides a global context wherein the first data is accessible to other applications within the view hierarchy.

12. A system comprising:
at least one input device;
at least one memory storing computer-executable instructions;
at least one hardware processor coupled to the at least one input device and the at least one memory, the at least one hardware processor configured to execute the computer-executable instructions to:
generate first data responsive to one or more inputs to the at least one input device;
determine input focus of a first input control of a first application;
determine that the first data is unhandled by a first application;
store the first data;
determine that the first application is configured to use a second application;
generate subsequent data from one or more additional inputs to the at least one input device;
store the subsequent data in an input queue of the second application;
based on the determination that the first application is configured to use the second application and a second input control of the second application has input focus, send the first data and the subsequent data to the second application; and
process the first data and the subsequent data using the second application.

13. The system of claim 12, wherein the at least one hardware processor is further configured to execute the computer-executable instructions to:
execute the second application;
perform a search with the second application using data associated with the first data and the subsequent data; and
present results of the search.

14. The system of claim 12, wherein the at least one hardware processor is further configured to execute the computer-executable instructions to:
store the first data in a global context accessible to the first application and the second application; and
based on the second input control having input focus, provide the first data stored in the global context to the second application.

15. The system of claim 12, wherein the at least one hardware processor is further configured to execute the computer-executable instructions to:
store the first data in a view hierarchy of a user interface for presentation, wherein the view hierarchy is maintained by a window manager service and provides a global context wherein the first data is accessible to other applications within the view hierarchy.

16. The system of claim 12, wherein the at least one hardware processor is further configured to execute the computer-executable instructions to:
store the first data using a WindowManagerService.java component as implemented in an Android Open Source Project ("AOSP") environment;
initiate execution of the second application using an instruction in a PhoneWindow.java component as implemented in the AOSP; and
store the subsequent data using a ViewRootImpl.java component as implemented in the AOSP.

17. The system of claim 12, wherein the storing of the first data and subsequent data are entered in an input queue of the second application.

18. The system of claim 12, wherein the at least one hardware processor is further configured to execute the computer-executable instructions to:
determine that the first data corresponds to at least a portion of previously stored designated data; and
wherein delivery of the first data is based on the determination that the first data corresponds to the at least portion of the previously stored designated data.

19. The system of claim 12, further comprising at least one clock coupled to the at least one hardware processor and computer-executable instructions to:
determine, using data from the clock, an elapsed time since the second application was executed;
determine the elapsed time exceeds a threshold time limit; and
terminate execution of the second application.

20. The system of claim 12, wherein the hardware processor is further configured to execute the computer-executable instructions to:
determine the second application is not executing; and
cause execution of the second application.

* * * * *